US011405900B2

(12) United States Patent
Park et al.

(10) Patent No.: US 11,405,900 B2
(45) Date of Patent: Aug. 2, 2022

(54) METHOD AND APPARATUS FOR HANDLING OVERHEAT OF ELECTRONIC DEVICE

(71) Applicant: Samsung Electronics Co., Ltd., Suwon-si (KR)

(72) Inventors: Suyoung Park, Suwon-si (KR); Suha Yoon, Suwon-si (KR); Euichang Jung, Suwon-si (KR); Mooyoung Kim, Suwon-si (KR); Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 16/670,244

(22) Filed: Oct. 31, 2019

(65) Prior Publication Data

US 2020/0145986 A1 May 7, 2020

Related U.S. Application Data

(60) Provisional application No. 62/754,841, filed on Nov. 2, 2018.

(30) Foreign Application Priority Data

Aug. 1, 2019 (KR) .......................... 10-2019-0094073

(51) Int. Cl.
*H04W 72/04* (2009.01)
*H04B 1/00* (2006.01)
(Continued)

(52) U.S. Cl.
CPC .......... *H04W 72/0413* (2013.01); *G01K 7/22* (2013.01); *H04B 1/005* (2013.01);
(Continued)

(58) Field of Classification Search
CPC ......... H04W 72/0413; H04W 72/0453; H04W 72/048; H04W 88/02; H04W 52/28;
(Continued)

(56) References Cited

U.S. PATENT DOCUMENTS 10,993,104 B2 * 4/2021 Kim ...................... H04L 5/0035
2008/0046132 A1 2/2008 Dalsgaard et al.
(Continued)

FOREIGN PATENT DOCUMENTS

WO 2018/125686 A2 7/2018

OTHER PUBLICATIONS

Huawei et al., 'CR on signalling introduction of UE overheating support in NR SA scenario', R2-1815143, 3GPP TSG-RAN WG2 meeting #103 bis, Chengdu, P.R. China, Sep. 28, 2018.
(Continued)

*Primary Examiner* — Brian T O Connor
(74) *Attorney, Agent, or Firm* — Jefferson IP Law, LLP

(57) ABSTRACT

An electronic device and method for efficiently processing overheat in an electronic device are provided. The electronic device includes a transceiver and at least one processor configured to identify overheat inside the electronic device and transmit, to a base station, a first message containing overheat assistance information generated in response to identifying the overheat inside the electronic device.

18 Claims, 24 Drawing Sheets

(51) Int. Cl.
  *G01K 7/22* (2006.01)
  *H01C 1/16* (2006.01)
  *H04W 88/02* (2009.01)
(52) U.S. Cl.
  CPC ..... *H04W 72/048* (2013.01); *H04W 72/0453* (2013.01); *H01C 1/16* (2013.01); *H04W 88/02* (2013.01)
(58) Field of Classification Search
  CPC .. H04W 52/0274; H04W 52/36; H04B 1/005; H04B 1/401; H04B 7/0693; G01K 7/22; G01K 1/024; G01K 3/06; H01C 1/16; H04M 2250/12; Y02D 30/70
  See application file for complete search history.

(56) References Cited

U.S. PATENT DOCUMENTS

| | | | |
|---|---|---|---|
| 2009/0215442 A1* | 8/2009 | Lindoff | H04B 1/40 455/423 |
| 2012/0064909 A1 | 3/2012 | Lindoff et al. | |
| 2012/0142394 A1 | 6/2012 | Huan | |
| 2013/0324059 A1 | 12/2013 | Lee et al. | |
| 2018/0199185 A1 | 7/2018 | Tenny et al. | |
| 2018/0278309 A1* | 9/2018 | Raghavan | H04B 7/0639 |
| 2020/0100099 A1* | 3/2020 | Tenny | H04W 88/06 |
| 2020/0128479 A1* | 4/2020 | Xu | H04W 8/24 |
| 2020/0221289 A1* | 7/2020 | Lee | H04L 5/001 |
| 2021/0152131 A1* | 5/2021 | Benson | H03F 1/306 |

OTHER PUBLICATIONS

Ericsson, 'UE overheating and capability restriction', R2-1814579, 3GPP TSGRAN WG2 meeting #103 bis, Chengdu, P.R. China, Sep. 27, 2018.

Intel Corporation, 'Introduction of overheating indication for NR SA', R2-1814966, 3GPP TSG-RAN WG2 meeting #103 bis, Chengdu, P.R. China, Sep. 28, 2018.

International Search Report and Written Opinion dated Feb. 6, 2020, issued in International Application No. PCT/KR2019/014599.

* cited by examiner

METHOD AND APPARATUS FOR HANDLING OVERHEAT OF ELECTRONIC DEVICE

CROSS-REFERENCE TO RELATED APPLICATION(S)

This application is based on and claims priority under 35 U.S.C. § 119(e) of a U.S. Provisional application Ser. No. 62/754,841, filed on Nov. 2, 2018, in the U.S. Patent and Trademark Office, and under 35 U.S.C. § 119(a) of a Korean patent application number 10-2019-0094073, filed on Aug. 1, 2019, in the Korean Intellectual Property Office, the disclosure of each of which is incorporated by reference herein in its entirety.

BACKGROUND

1. Field

The disclosure relates to methods and apparatuses for handling overheat of an electronic device.

2. Description of Related Art

In order to meet the demand for wireless data traffic soaring since the fourth generation (4G) communication system came to the market, there are ongoing efforts to develop enhanced fifth generation (5G) communication systems or pre-5G communication systems. To achieve a high data rate, 5G communication systems are considering implementation in mmWave bands other than high-frequency bands adopted for 3G and long-term evolution (LTE) systems. To mitigate pathloss on 5G communication systems and increase the reach of radio waves, the following techniques are taken into account for the 5G communication system, beamforming, massive multi-input multi-output (MIMO), full-dimensional MIMO (FD-MIMO), array antennas, analog beamforming, and large-scale antenna technology. Also being developed are various technologies to allow the 5G communication system an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid frequency-shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Various ongoing attempts are being made to apply 5G communication systems to Internet-of-Things (IoT) networks. For example, the sensor network, machine-to-machine (M2M), machine type communication (MTC), or other 5G techniques are implemented by schemes, such as beamforming, multi-input multi-output (MIMO), and array antenna schemes.

Overheat attributed to use of mmWave bands may be more likely in 5G communication electronic devices than in pre-5G communication electronic devices. Thus, a need may arise for technology capable of controlling overheat in electronic devices for seamless communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for efficiently processing overheat in an electronic device in a communication system.

Additional aspects will be set forth in part in the description which follows and, in part, will be apparent from the description, or may be learned by practice of the presented embodiments.

In accordance with an aspect of the disclosure, a method performed by an electronic device configured to communicate with a base station based on a first frequency range and a second frequency range is provided. The method includes identifying overheat inside the electronic device and transmitting, to the base station, a first message containing overheat assistance information generated in response to identifying the overheat inside the electronic device. The overheat assistance information may include information about a reduced maximum bandwidth of the first frequency range or information about a reduced maximum bandwidth of the second frequency range with a higher bandwidth than the first frequency range.

In accordance with another aspect of the disclosure, a method performed by an electronic device configured to communicate with a base station based on a first frequency range and a second frequency range is provided. The method includes identifying overheat inside the electronic device and transmitting, to the base station, a first message containing overheat assistance information generated in response to identifying the overheat inside the electronic device. The overheat assistance information may include information about a reduced maximum MIMO rank count of the first frequency range or information about a reduced maximum MIMO rank count of the second frequency range with a higher bandwidth than the first frequency range.

In accordance with another aspect of the disclosure, a method for controlling overheat by an electronic device is provided. The method includes comparing a reference voltage with a voltage of a battery configured to supply power to the electronic device and, when the battery voltage is a reference voltage or less, transmitting a first message containing overheat assistance information to a base station. The overheat assistance information may include information about a reduced maximum bandwidth of a frequency range in which the electronic device operates.

In accordance with another aspect of the disclosure, an electronic device configured to communicate with a base station based on a first frequency range and a second frequency range is provided. The electronic device includes a transceiver and at least one processor connected with the transceiver. The at least one processor may be configured to identify overheat inside the electronic device and transmit, to the base station, a first message containing overheat assistance information generated in response to identifying the overheat inside the electronic device. The overheat assistance information may include information about a reduced maximum bandwidth of the first frequency range or information about a reduced maximum bandwidth of the second frequency range with a higher bandwidth than the first frequency range.

In accordance with another aspect of the disclosure, an electronic device configured to communicate with a base station based on a first frequency range and a second frequency range is provided. The electronic device includes a transceiver and at least one processor connected with the transceiver. The at least one processor may be configured to identify overheat inside the electronic device and transmit, to the base station, a first message containing overheat assistance information generated in response to identifying the overheat inside the electronic device. The overheat assistance information may include information about a reduced maximum MIMO rank count of the first frequency range or information about a reduced maximum MIMO rank count of the second frequency range with a higher bandwidth than the first frequency range.

In accordance with another aspect of the disclosure, an electronic device is provided. The electronic device includes a transceiver and at least one processor connected with the transceiver. The at least one processor may be configured to compare a reference voltage with a voltage of a battery configured to supply power to the electronic device and, when the battery voltage is a reference voltage or less, transmit a first message containing overheat assistance information to a base station. The overheat assistance information may include information about a reduced maximum bandwidth of a frequency range in which the electronic device operates.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When an element "includes" another element, the element may further include the other element, rather excluding the other element, unless particularly stated otherwise.

In embodiments of the disclosure, when an element is "connected" with another element, the element may be "directly connected" with the other element, or the element may be "electrically connected" with the other element via an intervening element.

Further, the terms "unit," "module," or "part" as used herein denote a unit processing at least one function or operation, and a unit, module, or part may be implemented in hardware, software, or a combination thereof.

Figure 1A:
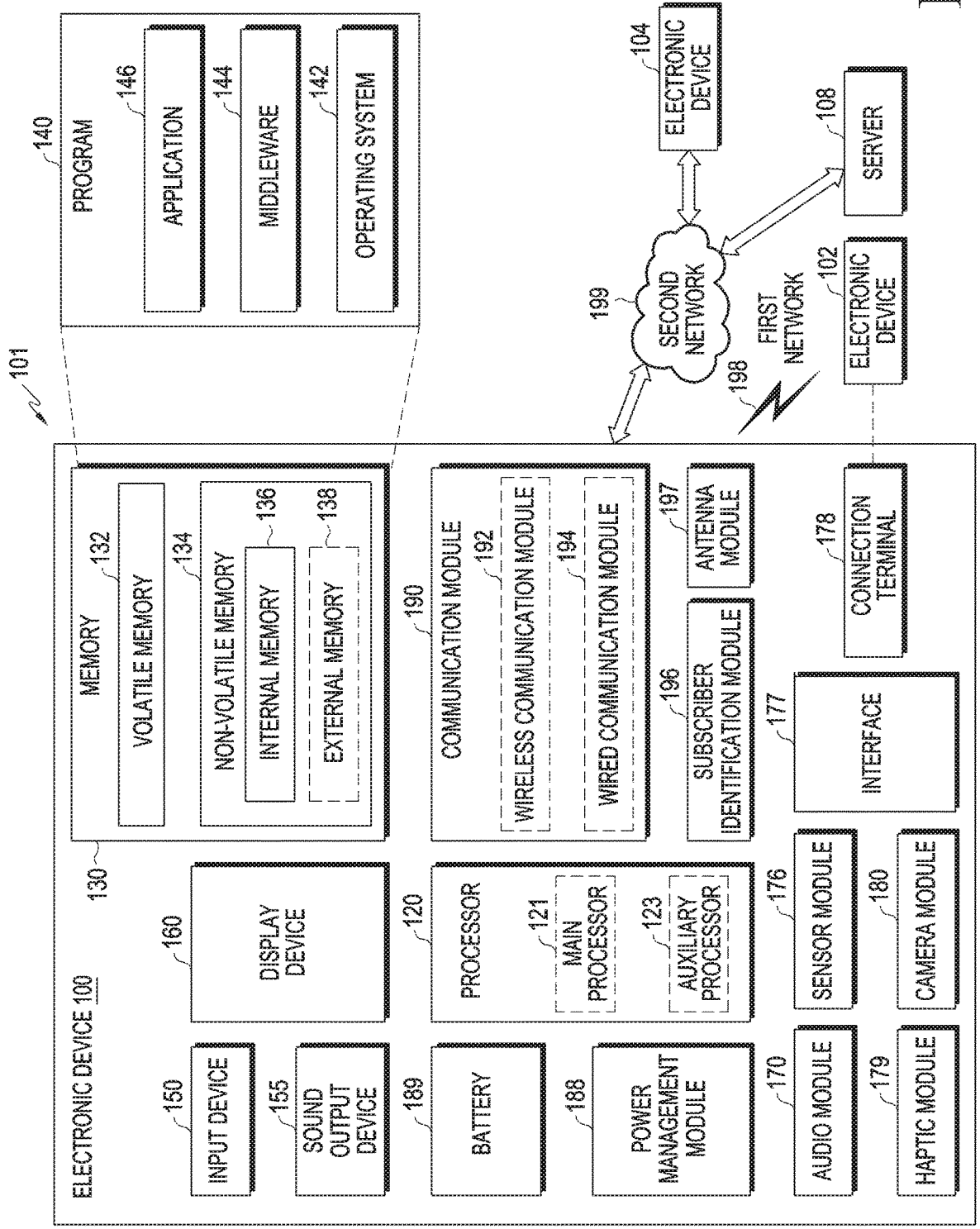
FIG. 1A is a block diagram illustrating an electronic device in a network environment according to an embodiment of the disclosure.

FIG. 1A is a block diagram illustrating an electronic device 100 in a network environment 101 according to various embodiments.

Referring to FIG. 1A, the electronic device 100 in the network environment 101 may communicate with an electronic device 102 via a first network 198 (e.g., a short-range wireless communication network), or an electronic device 104 or a server 108 via a second network 199 (e.g., a long-range wireless communication network). According to an embodiment, the electronic device 100 may communicate with the electronic device 104 via the server 108. According to an embodiment, the electronic device 100 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 100, or one or more other components may be added in the electronic device 100. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 100 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 100, instead of the main processor 121 while the main processor 121 is in an inactive (e.g., sleep or inactivated or deactivated) state or along with the main processor 121 while the main processor 121 is an active state (e.g., executing an application or activated). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 100. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 100, from the outside (e.g., a user) of the electronic device 100. The input device 150 may include, for example, a microphone, a mouse, a keyboard, or a digital pen (e.g., a stylus pen).

The sound output device 155 may output sound signals to the outside of the electronic device 100. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 100. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone)) directly or wirelessly connected with the electronic device 100.

The sensor module 176 may detect an operational state (e.g., power or temperature) of the electronic device 100 or an environmental state (e.g., a state of a user) external to the electronic device 100, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 100 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting user equipment (UE) 178 may include a connector via which the electronic device 100 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 100. According to one embodiment, the power management module 388 may be implemented as at least part of, for example, a power management integrated circuit (PMIC).

The battery 189 may supply power to at least one component of the electronic device 100. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 100 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 100 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 100. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 100 and the external electronic device 104 via the server 108 coupled with the second network 199. The first and second external electronic devices 102 and 104 each may be a device of the same or a different type from the electronic device 100. According to an embodiment, all or some of operations to be executed at the electronic device 100 may be executed at one or more of the external electronic devices 102, 104, or 108. For example, if the electronic device 100 should perform a function or a service automatically, or in response to a request from a user or another device, the electronic device 100, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 100. The electronic device 100 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 100). For example, a processor (e.g., the processor 120) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 1B:
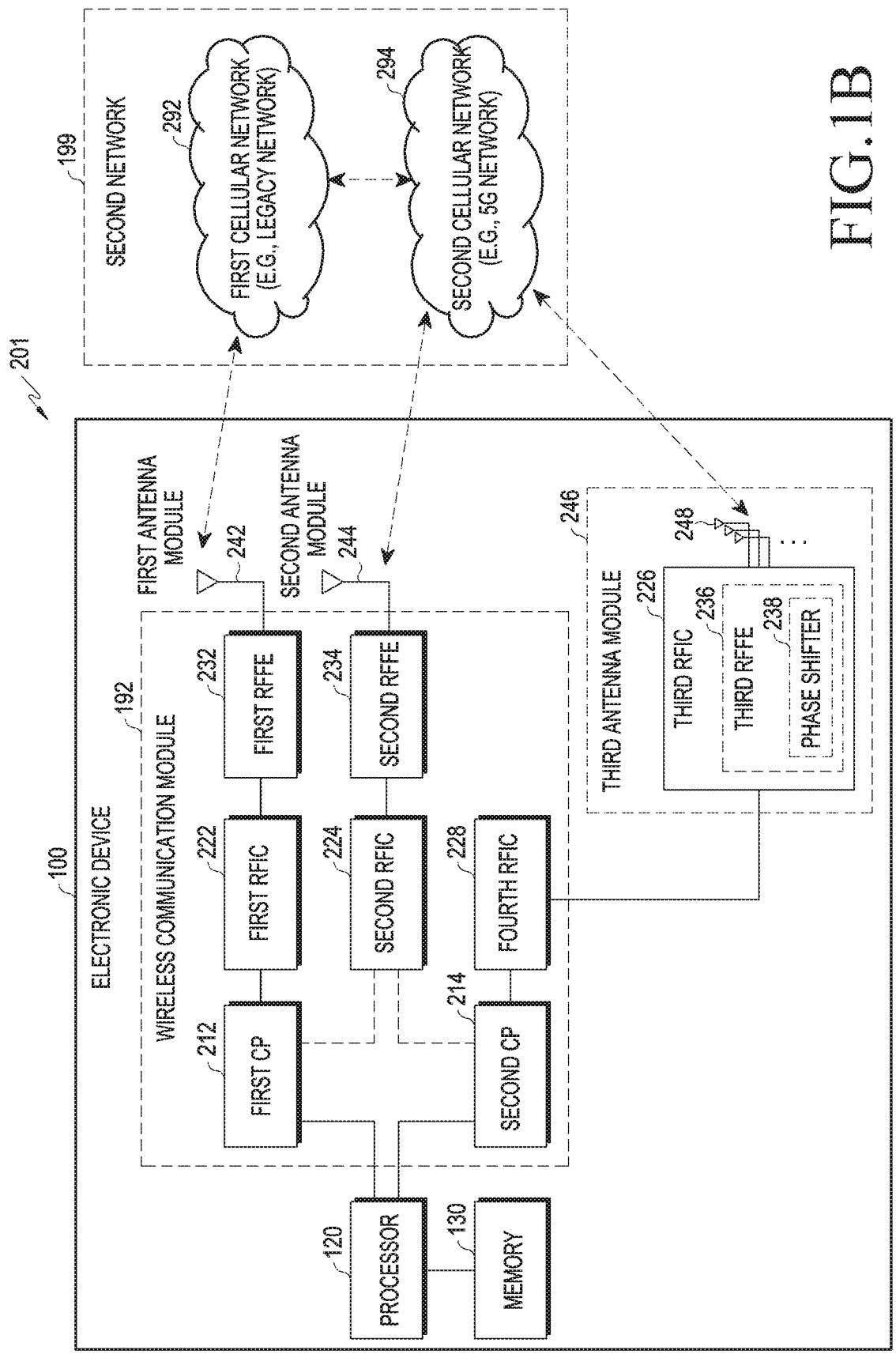
FIG. 1B is a block diagram illustrating an electronic device in a network environment including a plurality of cellular networks according to an embodiment of the disclosure.

FIG. 1B is a block diagram 201 of the electronic device 100 in the network environment including a plurality of cellular networks according to an embodiment of the disclosure.

Referring to FIG. 1B, the electronic device 100 may include a first communication processor (CP) 212, a second CP 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 100 may further include a processor 120 and a memory 130. The second network 199 may include a first cellular network 292 and a second cellular network 294. According to an embodiment, the electronic device 100 may further include at least one component among the components of FIG. 1A, and the second network 199 may further include at least one other network. According to an embodiment, the first CP 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first CP 212 or the second CP 214, along with the processor 120, an auxiliary processor 123, or a communication module 190, may be formed in a single chip or a single package. According to an embodiment, the first CP 212 and the second CP 214 may be connected together directly or indirectly by an interface (not shown) to provide or receive data or control signals unilaterally or bi-laterally.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via a third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 100 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form a third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 100 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 100 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 100 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 100, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Figure 1C:
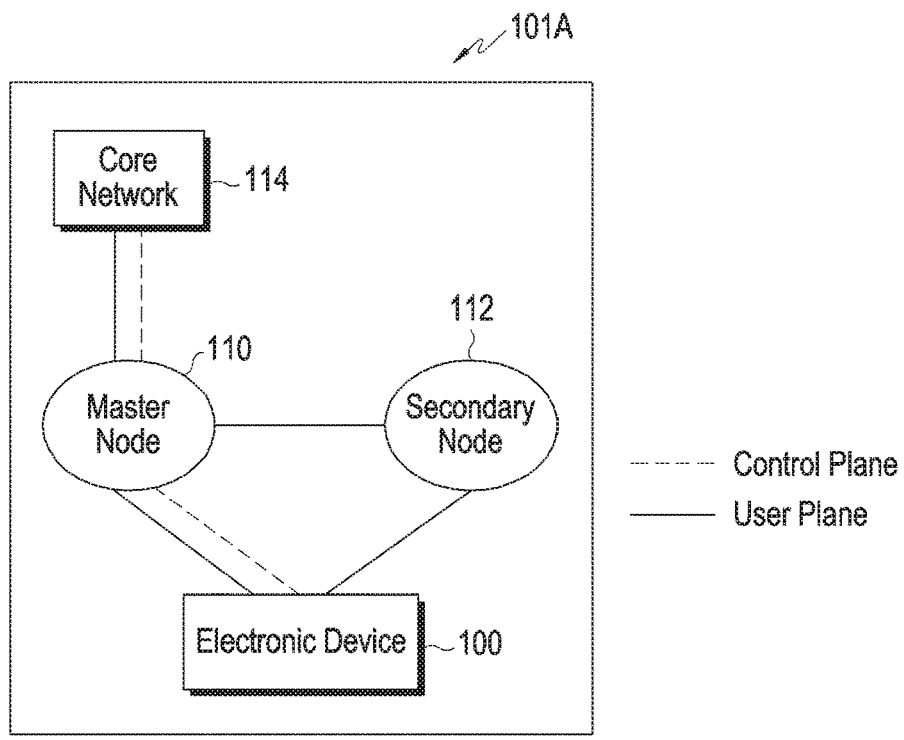
FIG. 1C is a view illustrating wireless communication systems providing at least one of a legacy communication network or a fifth generation (5G) communication network according to an embodiment of the disclosure.

FIG. 1C is a view illustrating wireless communication systems providing at least one of a legacy communication network or a 5G communication network according to an embodiment of the disclosure.

Figure 1D:
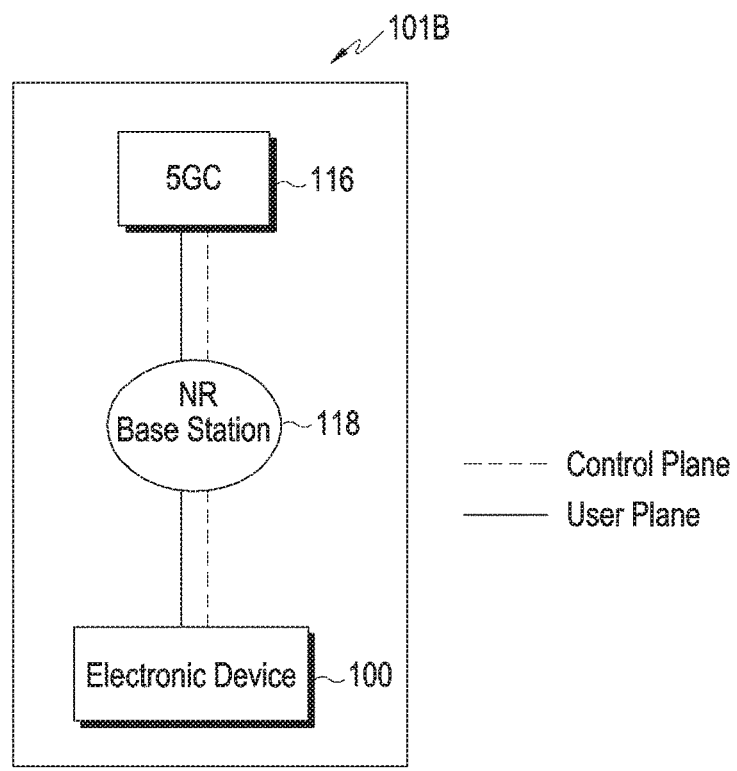
FIG. 1D is a view illustrating wireless communication systems providing at least one of a legacy communication network or a 5G communication network according to an embodiment of the disclosure.

FIG. 1D is a view illustrating wireless communication systems providing at least one of a legacy communication network or a 5G communication network according to an embodiment of the disclosure.

Figure 1E:
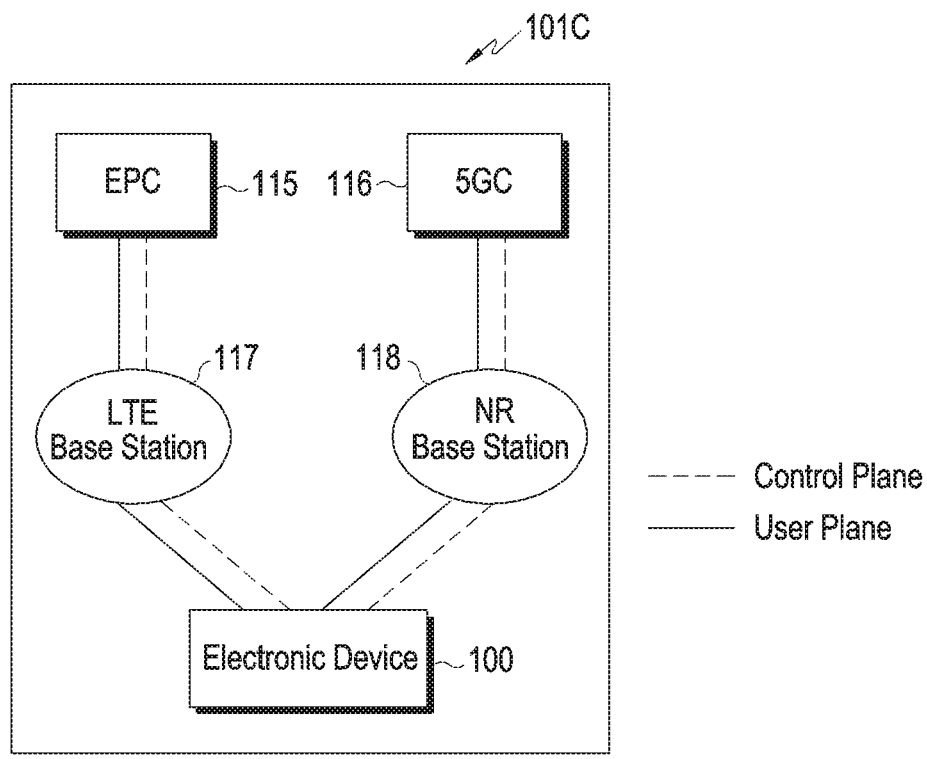
FIG. 1E is a view illustrating wireless communication systems providing at least one of a legacy communication network or a 5G communication network according to an embodiment of the disclosure.

FIG. 1E is a view illustrating wireless communication systems providing at least one of a legacy communication network or a 5G communication network according to an embodiment of the disclosure.

Referring to FIGS. 1C, 1D, and 1E, the respective network environment 101A, 101B, and 101C may include at least one of a legacy network and a 5G network. The legacy network may include, e.g., a 3GPP-standard 4G or LTE base station 118 (e.g., an eNodeB (eNB)) that supports radio access with the electronic device 100 and an evolved packet core (EPC) 115 that manages 4G communication. The 5G network may include, e.g., a new radio (NR) base station 118 (e.g., a gNodeB (gNB)) that supports radio access with the electronic device 100 and a 5th generation core (5GC) 116 that manages 5G communication for the electronic device 100.

According to an embodiment, the electronic device 100 may transmit or receive control messages and user data via legacy communication and/or 5G communication. The control messages may include, e.g., messages related to at least one of security control, bearer setup, authentication, registration, or mobility management for the electronic device 100. The user data may mean, e.g., user data except for control messages transmitted or received between the electronic device 100 and the core network 114 (e.g., the EPC 115).

Referring to FIG. 1C, according to an embodiment, the electronic device 100 may transmit or receive at least one of a control message or user data to/from at least part (e.g., the NR base station 118 or 5GC 116) of the 5G network via at least part (e.g., the LTE base station 117 or EPC 115) of the legacy network.

According to an embodiment, the network environment 101A may control a network environment that provides multi-radio access technology (RAT) dual connectivity (MR-DC) to the LTE base station 117 and the NR base station 118 and transmits or receives control messages to/from the electronic device 100 via the core network 114 of one of the EPC 115 or the 5GC 116.

According to an embodiment, in the MR-DC environment, one of the LTE base station 117 or the NR base station 118 may operate as a master node (MN) 110, and the other as a secondary node (SN) 112. The MN 110 may be connected with the core network 114 to transmit or receive control messages. The MN 110 and the SN 112 may be connected with each other via a network interface to transmit or receive messages related to radio resource (e.g., communication channel) management therebetween.

According to an embodiment, the MN 110 may include the LTE base station 117, the SN 112 may include the NR base station 118, and the core network 114 may include the EPC 115 (e.g., E_UTRA NR dual connectivity (EN-DC)). For example, the electronic device 100 may transmit or receive control messages via the LTE base station 117 and the EPC 115 and may transmit or receive user data via the LTE base station 117 and the NR base station 118.

Alternatively, the MN 110 may include the NR base station 118, the SN 112 may include the LTE base station 117, and the core network 114 may include the 5GC 116 (e.g., NR E_UTRA NR dual connectivity (NE-DC)). For example, the electronic device 100 may transmit or receive control messages through the NR base station 118 and the 5GC 116 and may transmit or receive user data via the LTE base station 117 and the NR base station 118.

Referring to FIG. 1D, according to an embodiment, the 5G network may transmit or receive control messages and user data independently from the electronic device 100.

Referring to FIG. 1E, according to an embodiment, the legacy network and the 5G network each may provide data transmission/reception independently. For example, the electronic device 100 and the EPC 115 may transmit or receive control messages and user data via the LTE base station 118. As another example, the electronic device 100 and the 5GC 116 may transmit or receive control messages and user data via the NR base station 118.

According to an embodiment, the electronic device 100 may be registered in at least one of the EPC 115 or the 5GC 116 to transmit or receive control messages.

According to an embodiment, the EPC 115 or the 5GC 116 may interwork with each other to manage communication for the electronic device 100. For example, mobility information for the electronic device 100 may be transmitted or received via the interface between the EPC 115 and the 5GC 116.

Figure 1F:
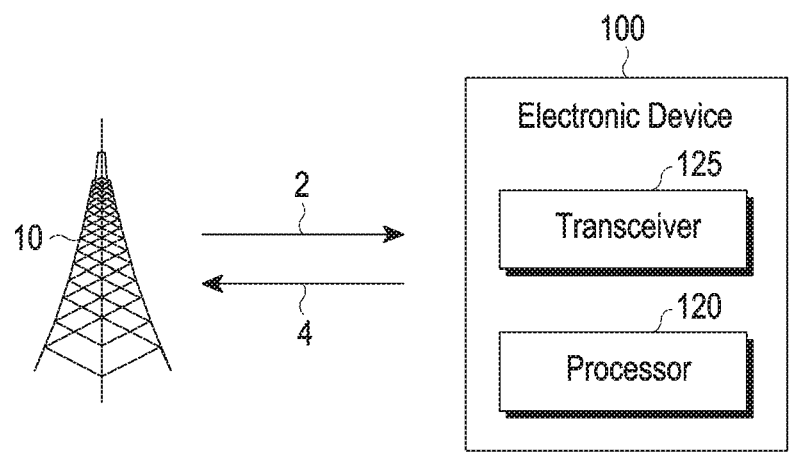
FIG. 1F is a view illustrating a wireless communication system according to an embodiment of the disclosure.

FIG. 1F is a view illustrating a wireless communication system according to an embodiment of the disclosure.

Referring to FIG. 1F, the wireless communication system may include a base station (or a cell) 10 and an electronic device 100.

According to an embodiment, the base station 10 may wirelessly communicate with the electronic device 100 via one or more base station antennas. For example, the base station 10 and the electronic device 100 may communicate with each other via a downlink (DL) channel 2 and an uplink (UL) channel 4. The wireless communication network between the base station 10 and the electronic device 100 may support communication by multiple users by sharing available network resources. For example, information may be transferred over the wireless communication network in various schemes, such as code division multiple access (CDMA), frequency division multiple access (FDMA), time division multiple access (TDMA), orthogonal frequency division multiple access (OFDMA), or single carrier frequency division multiple access (SC-FDMA).

Although one base station 10 is shown in the figures, this is merely for ease of description, and the wireless communication system 1 may rather include one or more base stations 10. The wireless communication system 1 may include different types of base stations (e.g., macro, micro, and/or pico base stations).

According to an embodiment, the base station 10 may provide communication coverage for a predetermined geographical area. As an example, the base station 10 may also be termed, e.g., a base transceiver station (BTS), a radio base station, an access point (AP), a radio frequency, a NodeB, an eNodeB (eNB), a gNodeB (gNB), a home nodeB, a home eNodeB, or be named in other adequate terms.

According to an embodiment, the electronic device 100, as a wireless communication device, may be stationary or mobile and may collectively denote various devices capable of transmitting or receiving data and/or control information via communication with the base station 10. For example, the electronic device 100 may be termed a user equipment (UE), a mobile station (MS), a mobile terminal (MT), a user terminal (UT), a subscribe station (SS), a wireless device, a handheld device, or the like. For example, the electronic device 100 may be a constituent apparatus of an IoT network, and the functionality of the apparatus is not limited to communication with the base station.

The electronic device 100 may include a transceiver 125. The transceiver 125 may perform various functions related to the radio interface between the base station 10 and the electronic device 100. For example, the transceiver 125 may transmit signals to the base station 10 and receive signals from the base station 10. According to an embodiment, the transceiver 125 may be configured to modulate transmitting signals and/or demodulate signals received from the base station 10 or to perform various communication functions, e.g., encoding or decoding, necessary for communication with the base station 10.

The electronic device 100 may include a processor 120. For example, the processor 120 may include one or more processors. According to an embodiment, when the processor 120 includes a plurality of processors, the processor 120 may include at least one of an application processor (AP), a first communication processor (CP), and a second CP.

According to an embodiment, the processor 120 may identify overheat inside the electronic device 100. According to an embodiment, the processor 120 may generate a first message containing overheat assistance information generated in response to identifying the overheat inside the electronic device 100. According to an embodiment, the first CP may generate a first message containing overheat assistance information generated in response to identifying the overheat inside the electronic device 100. According to an embodiment, the second CP may generate a first message containing overheat assistance information generated in response to identifying the overheat inside the electronic device 100.

According to an embodiment, the processor 120 may output the first message to the transceiver 125. For example, the processor 120 may control the transceiver 125 to transmit the first message to the base station 10.

According to an embodiment, the AP may identify overheat inside the electronic device 100. The AP may generate a message containing overheat assistance information generated in response to identifying the overheat inside the electronic device 100. According to an embodiment, the AP may output the overheat assistance information-containing message to the CP. According to an embodiment, the AP may output the message to the CP. According to an embodiment, the first CP may generate the first message containing overheat assistance information in response to receiving the message output from the AP. According to an embodiment, the second CP may generate the first message containing overheat assistance information in response to receiving the message output from the AP.

Figure 2:
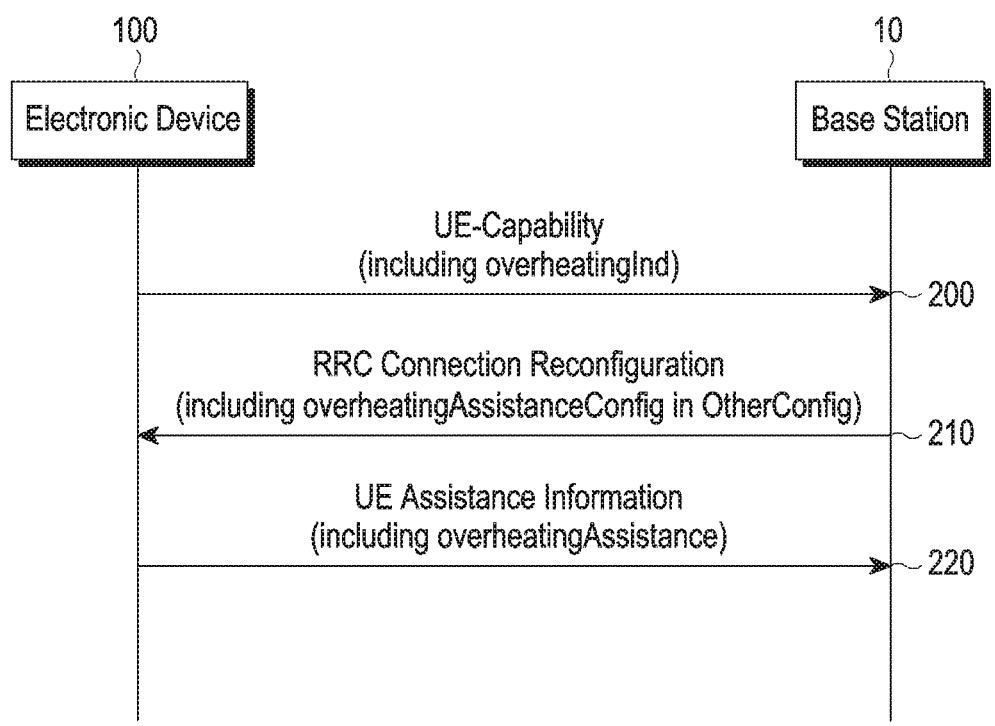
FIG. 2 is a view illustrating an example of transmission/reception of signals between an electronic device and a base station according to an embodiment of the disclosure.

FIG. 2 is a view illustrating an example of transmission/reception of signals between an electronic device and a base station according to an embodiment of the disclosure.

Referring to FIG. 2, according to an embodiment, in operation 200, the electronic device 100 may transmit a second message (UE-Capability) containing performance information about the electronic device 100 to the base station 10. For example, the second message (UE-Capability) may include information (OverheatingInd) about whether the electronic device 100 supports generation of overheat assistance information. For example, the second message (UE-Capability) may include information (OverheatingInd) about whether the electronic device 100 may transmit the generated overheat assistance information to the base station 10. For example, the information (OverheatingInd) about whether to support generation of overheat assistance information may be included, as one-bit information, in the second message.

According to an embodiment, the second message (UE-Capability) may include a parameter indicating the maximum performance of the electronic device 100. According to an embodiment, the second message (UE-Capability) may include a parameter indicating the performance of the electronic device 100. For example, the parameter indicating the performance of the electronic device 100 may include at least one of higher MIMO rank, extend maximum bandwidth (BW), extended maximum component carrier (CC), extend maximum bandwidth part (BWP), and extend maximum operating BW.

According to an embodiment, in operation 210, the electronic device 100 may receive a radio resource control (RRC) connection reconfiguration message from the base station 10. According to an embodiment, the RRC connection reconfiguration message may include resource configuration information about the first message (UE assistance information) about the electronic device 100. For example, the resource configuration information may include transmission prohibiting timer information for the first message (UE assistance information).

According to an embodiment, the resource configuration information for the first message (UE assistance information) may include information for duration of the first message (UE assistance information).

According to an embodiment, the resource configuration information for the first message (UE assistance information) may include at least one of resource configuration information for the first message (UE assistance information) for the master node and resource configuration information for the first message (UE assistance information) for the secondary node. For example, the first message (UE assistance information) for the master node may be configured to be transmitted to the master node or the secondary node. For example, the first message (UE assistance information) for the secondary node may be configured to be transmitted to the master node or the secondary node.

According to an embodiment, the base station 10 may determine the RRC parameter that is to be set on the UE using the received performance information for the electronic device 100. For example, the base station 10 may determine at least one or more BWPs set on the electronic device 100 based on a supportable channel bandwidth. For example, the base station 10 may determine a combination of at least one or more BWPs set on the electronic device 100 based on a supportable channel bandwidth. For example, the base station 10 may determine to configure at least one or more BWPs set on the electronic device 100 based on an OFDM subcarrier spacing (SCS) where the electronic device 100 may operate. For example, the base station 10 may determine carrier aggregation or dual connectivity configuration based on at least one of performance information or information indicating whether the electronic device 100 supports carrier aggregation or dual connectivity.

For example, the base station 10 may determine a band combination of dual connectivity or carrier aggregation including at least one or more bands set on the electronic device 100 based on the combination of bands where the electronic device 100 may operate. The base station 10 may transmit an RRC connection reconfiguration message to the electronic device 100 based on the determined RRC parameter.

According to an embodiment, although not shown, the electronic device 100 may transmit an RRC connection reconfiguration complete message to the base station 10 in response to the received RRC connection reconfiguration message.

According to an embodiment, in operation 220, the electronic device 100 may transmit the first message (UE assistance information) containing overheat assistance information (OverheatingAssistance) generated in response to identifying overheat inside the electronic device 100 to the base station 10. The first message (UE assistance information) containing the overheat assistance information (OverheatingAssistance) is described below in greater detail.

According to an embodiment, the electronic device 100 may be configured to transmit or receive radio signals to/from the base station 10 in at least one of a first frequency range (Frequency Range 1 (FR1)) and a second frequency range (Frequency Range 2 (FR2)).

channel bandwidth corresponding to the first frequency range (FR1), and the maximum bandwidth may be the maximum channel bandwidth corresponding to the second frequency range (FR2).

According to an embodiment, the overheat assistance information (OverheatingAssistance) may include information about the reduced maximum bandwidth (reducedMaxBW-FR1) of the first frequency range (FR1) or information about the reduced maximum bandwidth (reducedMaxBW-FR2) of the second frequency range (FR2). Various relevant embodiments are described below.

Figure 3:
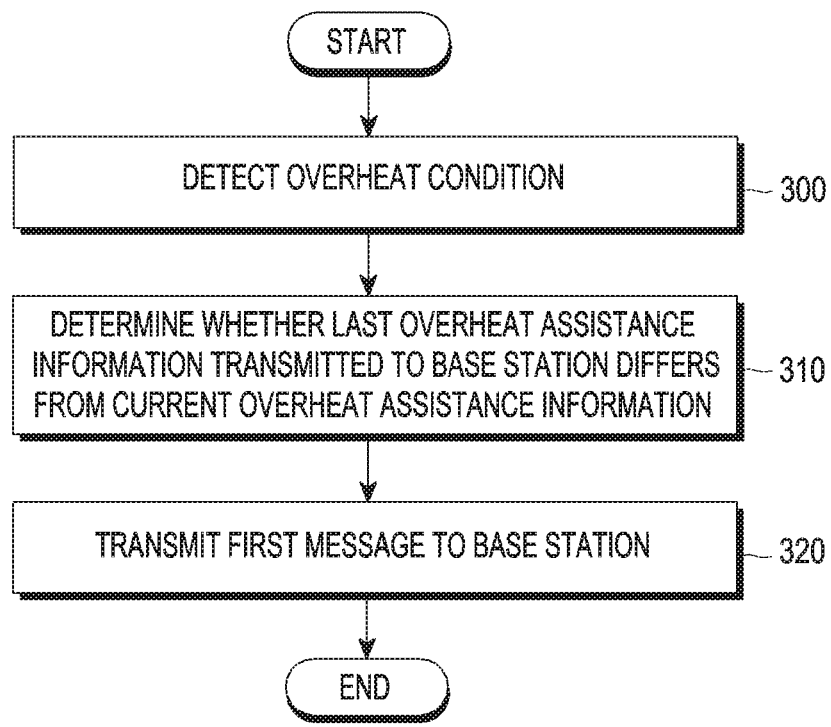
FIG. 3 is a flowchart illustrating an operation of determining whether to transmit an assistance message by an electronic device according to an embodiment of the disclosure.

FIG. 3 is a flowchart illustrating an operation of determining whether to transmit an assistance message by an electronic device according to an embodiment of the disclosure.

Referring to FIG. 3, according to an embodiment, in operation 300, the electronic device 100 may detect an overheat condition. For example, the electronic device 100 may identify overheat inside the electronic device 100. The electronic device 100 may generate overheat assistance information (OverheatingAssistance) in response to identifying the overheat inside the electronic device 100. Various relevant embodiments are described below.

According to an embodiment, in operation 310, the electronic device 100 may determine whether the overheat assistance information (OverheatingAssistance) included in

TABLE 1

| | | 1.4 | 3 | 5 | 10 | 15 | 20 | 25 | 40 | 50 | 60 | 80 | 100 | 200 | 400 |
|---|---|---|---|---|---|---|---|---|---|---|---|---|---|---|---|
| LTE | CBW (MHz) | 1.4 | 3 | 5 | 10 | 15 | 20 | | | | | | | | |
| | SCS (15 kHz) | O | O | O | O | O | O | | | | | | | | |
| NR Sub-6 | CBW (MHz) | | | 5 | 10 | 15 | 20 | 25 | 40 | 50 | 60 | 80 | 100 | | |
| | SCS (15 kHz) | | | O | O | O | O | O | O | O | N/A | N/A | N/A | | |
| | SCS (30 kHz) | | | O | O | O | O | O | O | O | O | O | O | | |
| | SCS (60 kHz) | | | N/A | O | O | O | O | O | O | O | O | O | | |
| NR Above-6 | CBW (MHz) | | | | | | | | | 50 | | | 100 | 200 | 400 |
| | SCS (60 kHz) | | | | | | | | | O | | | O | O | N/A |
| | SCS (120 kHz) | | | | | | | | | O | | | O | O | O |

Referring to Table 1 above, the first frequency range (FR1) may correspond to the Sub-6 of the NR communication system, and the second frequency range (FR2) may correspond to the Above-6 of the NR communication system. According to an embodiment, the first frequency range (FR1) may include a range from 450 Hz to 6,000 MHz, and the second frequency range (FR2) may include a range from 24,260 MHz to 52,600 MHz. The second frequency range (FR2) may correspond to an mmWave band. In the first frequency range (FR1), the base station may provide a channel bandwidth (CBW) ranging from 5 MHz to 100 MHz and, in the second frequency range (FR2), the base station may provide a channel bandwidth ranging from 50 MHz to 400 MHz, but embodiments of the disclosure are not limited thereto. Alternatively, the channel bandwidth of each of the first frequency range (FR1) may differ from the channel bandwidth of each of the second frequency range (FR2). The first frequency range (FR1) may provide three subcarrier spacings (SCSs) each of which may correspond to a respective one of 15 kHz, 30 kHz, and 60 kHz, but embodiments of the disclosure are not limited thereto. The second frequency range (FR2) may provide three SCSs each of which may correspond to a respective one of 60 kHz, 120 kHz, and 240 kHz, but embodiments of the disclosure are not limited thereto. For example, each SCS of the first frequency range (FR1) may differ from each SCS of the second frequency range (FR2).

According to an embodiment, the maximum bandwidth of the first frequency range (FR1) may be the maximum the last first message (UE assistance information) transmitted to the base station 10 differs from the overheat assistance information (OverheatingAssistance) that the electronic device 100 has generated in response to identifying the overheat inside the electronic device 100.

According to an embodiment, in operation 320, upon determining that the overheat assistance information (OverheatingAssistance) included in the first message (UE assistance information) transmitted to the base station 10 differs from the overheat assistance information (OverheatingAssistance) that the electronic device 100 has generated in response to identifying the overheat inside the electronic device 100, the electronic device 100 may transmit a first message (UE assistance information) containing the generated overheat assistance information (OverheatingAssistance) to the base station 10. According to an embodiment, the data transmission of operation 320 may undergo determination of whether the transmission prohibiting timer for the first message (UE assistance information) has expired before transmitting the data.

Figure 4:
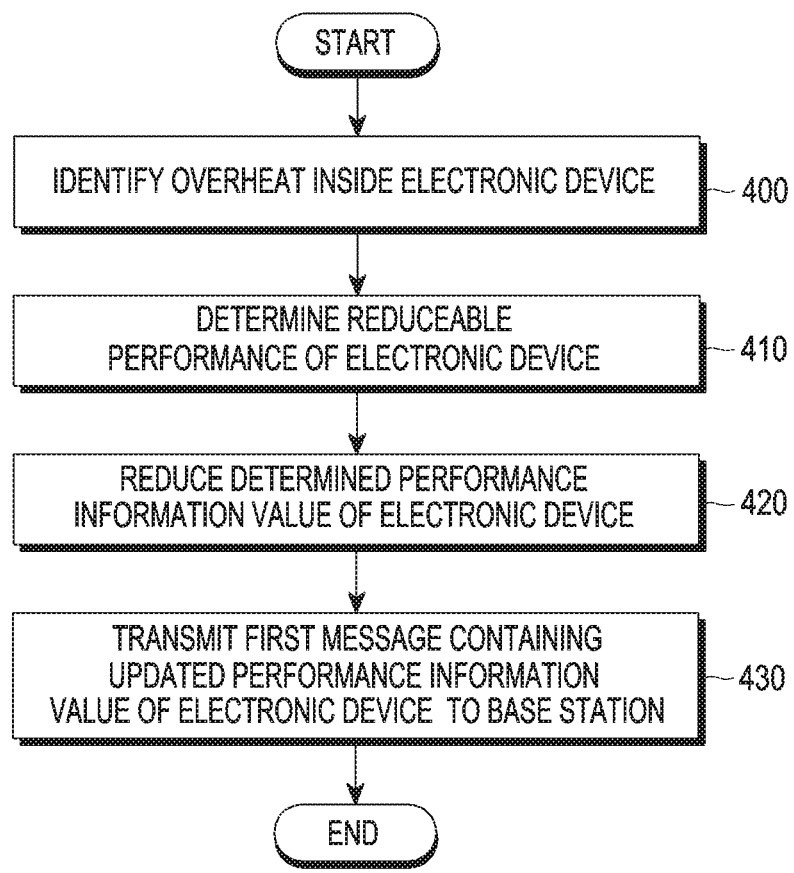
FIG. 4 is a flowchart illustrating an operation of controlling performance information about an electronic device by the electronic device according to an embodiment of the disclosure.

FIG. 4 is a flowchart illustrating an operation of controlling performance information about an electronic device by the electronic device according to an embodiment of the disclosure.

Referring to FIG. 4, according to an embodiment, in operation 400, the electronic device 100 (e.g., the processor 120 of FIG. 1A) may identify overheat inside the electronic device 100. According to an embodiment, the overheat inside the electronic device 100 may be overheat that occurs in the radio frequency (RF) path, antenna module, or processor (e.g., the processor 120 of FIG. 1A) embedded in the electronic device 100. According to an embodiment, the processor (e.g., the processor 120 of FIG. 1A) may identify the overheat inside the electronic device 100, and the information may be transferred to at least one of the first CP 212 or the second CP 214.

According to an embodiment, in operation 410, the electronic device 100 may determine the performance of the electronic device 100 that the electronic device 100 may reduce. According to an embodiment, upon receiving the information, one of the first CP 212 or the second CP 214 may determine the performance of the electronic device 100 that may be reduced.

According to an embodiment, the performance of the electronic device 100 that the electronic device 100 may reduce may be the maximum bandwidth of the frequency range in which the electronic device 100 operates. For example, the performance of the electronic device 100 which the electronic device 100 may reduce may be the maximum bandwidth of the first frequency range (FR1) in which the electronic device 100 operates or the maximum bandwidth of the second frequency range (FR2) in which the electronic device 100 operates.

According to an embodiment, the performance of the electronic device 100 which the electronic device 100 may reduce may be the maximum MIMO layer (MIMO rank) count of the frequency range in which the electronic device 100 operates. The maximum MIMO rank count of the frequency range may mean the maximum number of MIMO layers or ranks that may be set on the UE or per component carrier (CC). For example, the term "MIMO rank count" may interchangeably be used with the terms "number of MIMO layers" or "number of MIMO ranks." For example, the performance of the electronic device 100 which the electronic device 100 may reduce may be the maximum MIMO rank count of the first frequency range (FR1) in which the electronic device 100 operates or the maximum MIMO rank count of the second frequency range (FR2) in which the electronic device 100 operates.

According to an embodiment, in operation 420, the electronic device 100 may reduce the determined performance information value of the electronic device 100 that the electronic device 100 may reduce. According to an embodiment, in operation 420, the electronic device 100 may include the reduced performance information value of the electronic device 100 in the first message (UE assistance information).

According to an embodiment, the electronic device 100 may reduce the maximum bandwidth of the first frequency range (FR1) to the reduced maximum bandwidth (reducedMaxBW-FR1) of the first frequency range (FR1) and reduce the maximum bandwidth of the second frequency range (FR2) to the reduced maximum bandwidth (reducedMaxBW-FR2) of the second frequency range (FR2).

According to an embodiment, the reduced maximum bandwidth (reducedMaxBW-FR1) of the first frequency range (FR1) and the reduced maximum bandwidth (reducedMaxBW-FR2) of the second frequency range (FR2) may be any one of 0 MHz, 10 MHz, 20 MHz, 30 MHz, 40 MHz, 50 MHz, 60 MHz, 80 MHz, 100 MHz, 200 MHz, 300 MHz, and 400 MHz.

According to an embodiment, the reduced maximum bandwidth (reducedMaxBW-FR1) of the first frequency bandwidth (reducedMaxBW-FR1) of the first frequency range (FR1) and the reduced maximum bandwidth (reducedMaxBW-FR2) of the second frequency range (FR2) may be set as a value corresponding to a predetermined reduced aggregated bandwidth (ReducedAggregatedBandwidth). For example, the reduced aggregated bandwidth (ReducedAggregatedBandwidth) may include at least one of 0 MHz, 10 MHz, 20 MHz, 30 MHz, 40 MHz, 50 MHz, 60 MHz, 80 MHz, 100 MHz, 200 MHz, 300 MHz, and 400 MHz.

According to an embodiment, the electronic device 100 may reduce the maximum MIMO rank count of the first frequency range (FR1) to the reduced maximum MIMO rank count (reducedMaxMIMO-LayersFR1) of the first frequency range (FR1) and reduce the maximum MIMO rank count of the second frequency range (FR2) to the reduced maximum MIMO rank count (reducedMaxMIMO-LayersFR2) of the second frequency range (FR2).

According to an embodiment, in operation 430, the electronic device 100 may transmit the first message (UE assistance information) to the base station.

According to an embodiment, the first message (UE assistance information) may include the information for the reduced maximum bandwidth (reducedMaxBW-FR1) of the first frequency range (FR1) or the information for the reduced maximum bandwidth (reducedMaxBW-FR2) of the second frequency range (FR2).

According to an embodiment, the information for the reduced maximum bandwidth (reducedMaxBW-FR1) of the first frequency range (FR1) may include information indicating the reduced maximum bandwidth (reducedBW-FR1-DL) of the downlink of the first frequency range (FR1) and information indicating the reduced maximum bandwidth (reducedBW-FR1-UL) of the uplink of the first frequency range (FR1). According to an embodiment, the information for the reduced maximum bandwidth (reducedMaxBW-FR2) of the second frequency range (FR2) may include information indicating the reduced maximum bandwidth (reducedBW-FR2-DL) of the downlink of the second frequency range (FR2) and information indicating the reduced maximum bandwidth (reducedBW-FR2-UL) of the uplink of the second frequency range (FR2).

According to an embodiment, each of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) may be set to one of a plurality of bandwidths including 0 MHz.

According to an embodiment, each of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) may correspond to 0 MHz. For example, "the bandwidth of the second frequency range (FR2) is 0 MHz" may mean that the electronic device 100 does not use the second frequency range (FR2). For example, "the bandwidth of the second frequency range (FR2) is 0 MHz" may mean that the electronic device 100 intends to inactivate (sleep or deactivate) the components corresponding to the second frequency range (FR2).

According to an embodiment, when any one of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) is identified as corresponding to 0 MHz, the base station 10 may determine not to allocate the downlink of the second frequency range (FR2) or the uplink of the second frequency range (FR2) allocated to the electronic device 100.

According to an embodiment, the first message (UE assistance information) may include information about the reduced maximum MIMO rank count (reducedMaxMIMO-LayersFR1) of the first frequency range (FR1) or information about the reduced maximum MIMO rank count (reducedMaxMIMO-LayersFR2) of the second frequency range (FR2).

According to an embodiment, the information about the reduced maximum MIMO rank count (reducedMaxMIMO-LayersFR1) of the first frequency range (FR1) may include information indicating the reduced maximum MIMO rank count (reducedMaxMIMO-LayersFR1-DL) of the downlink of the first frequency range (FR1) and information indicating the reduced maximum MIMO rank count (reducedMaxMIMO-LayersFR1-UL) of the uplink of the first frequency range (FR1). According to an embodiment, the information about the reduced maximum MIMO rank count (reducedMaxMIMO-LayersFR2) of the second frequency range (FR2) may include information indicating the reduced maximum MIMO rank count (reducedMaxMIMO-LayersFR2-DL) of the downlink of the second frequency range (FR2) and information indicating the reduced maximum MIMO rank count (reducedMaxMIMO-LayersFR2-UL) of the uplink of the second frequency range (FR2).

TABLE 2

| Contents on Signaling |
|---|
| OverheatingAssistance-r15x0,, =SEQUENCE { |
|   reducedMaxCCs SEQUENCE { |
|     reducedCCsDL INTEGER (0..31), |
|     reducedCCsUL INTEGER (0..31) |
|     (OPTIONAL) |
|   reducedMaxBW-FR1 SEQUENCE { |
|   reducedBW-FR1-DL ReducedAggregatedBandwidth, |
|   reducedBW-FR1-UL ReducedAggregatedBandwidth |
|   } OPTIONAL, |
|   reducedMaxBW-FR2 SEQUENCE { |
|   reducedBW-FR2-DL ReducedAggregatedBandwidth, |
|   reducedBW-FR2-UL ReducedAggregatedBandwidth |
|   } OPTIONAL, |
|   reducedMaxMIMO-LayersFR1 SEQUENCE { |
|   reducedMIMO-LayersFR1-DL MIMO-LayersDL, |
|   reducedMIMO-LayersFR1-UL MIMO-LayersUL |
|   } OPTIONAL, |
|   reducedMaxMIMO-LayersFR2 SEQUENCE { |
|   reducedMIMO-LayersFR2-DL MIMO-LayersDL, |
|   reducedMIMO-LayersFR2-UL MIMO-LayersUL |
|   reducedDutycycle    SEQUENCE { |
| reducedDutycycleDL    INTEGER (0..E1), |
| reducedDutycycleUL    INTEGER (0..E2) |
|   } OPTIONAL, |
|   FR-restriction    SEQUENCE { |
| FR-restrictionDL    INTEGER (0..F 1), |
| FR-restrictionUL    INTEGER (0..F2) |
|   } OPTIONAL |
| or |
| FR-restriction    SEQUENCE { |
| FR-restriction    ENUMERATED {FR1,FR2} |
|   } OPTIONAL |
| or |
| FR2-restriction    SEQUENCE { |
| FR2-restriction    ENUMERATED {ON,OFF} |
|   } OPTIONAL |
| } |
| FR-restriction    SEQUENCE { |
| FR-restrictionDL    INTEGER (0..F 1), |
| FR-restrictionUL    INTEGER (0..F2) |
|   } OPTIONAL |
| SCellReleaseRequestInfo-r15    SEQUENCE |
| (SIZE(1..maxNrofSCells)) OF SCellIndex |
| or |
| SCellReleaseRequestInfoFR1-r15    SEQUENCE |
| (SIZE(1..maxNrofSCells)) OF SCellIndex |

TABLE 2-continued

| Contents on Signaling |
|---|
| SCellReleaseRequestInfoFR2-r15    SEQUENCE |
| (SIZE(1..maxNrofSCells)) OF SCellIndex |
| or |
| SCellReleaseRequestInfoDL-r15    SEQUENCE |
| (SIZE(1..maxNrofSCells)) OF SCellIndex |
| SCellReleaseRequestInfoUL-r15    SEQUENCE |
| (SIZE(1..maxNrofSCells)) OF SCellIndex |
| or |
| ScellReleaseRequestInfoDLFR1-r15    SEQUENCE |
| (SIZE(1..maxNrofSCells)) OF SCellIndex |
| SCellReleaseRequestInfoULFR1-r15    SEQUENCE |
| (SIZE(1..maxNrofSCells)) OF SCellIndex |
| SCellReleaseRequestInfoDLFR2-r15    SEQUENCE |
| (SIZE(1..maxNrofSCells)) OF SCellIndex |
| SCellReleaseRequestInfoULFR2-r15    SEQUENCE |
| (SIZE(1..maxNrofSCells)) OF SCellIndex |
| SCellDeactivateRequestInfo-r15    SEQUENCE |
| (SIZE(1..maxNrofSCells)) OF SCellIndex |
| or |
| SCellDeactivateRequestInfoFR1-r15    SEQUENCE |
| (SIZE(1..maxNrofSCells)) OF SCellIndex |
| SCellDeactivateRequestInfoFR2-r15    SEQUENCE |
| (SIZE(1..maxNrofSCells)) OF SCellIndex |
| or |
| SCellDeactivateRequestInfoDL-r15    SEQUENCE |
| (SIZE(1..maxNrofSCells)) OF SCellIndex |
| SCellDeactivateRequestInfoUL-r15    SEQUENCE |
| (SIZE(1..maxNrofSCells)) OF SCellIndex |
| or |
| ScellDeactivateRequestInfoDLFR1-r15    SEQUENCE |
| (SIZE(1..maxNrofSCells)) OF SCellIndex |
| SCellDeactivateRequestInfoULFR1-r15    SEQUENCE |
| (SIZE(1..maxNrofSCells)) OF SCellIndex |
| SCellDeactivateRequestInfoDLFR2-r15    SEQUENCE |
| (SIZE(1..maxNrofSCells)) OF SCellIndex |
| SCellDeactivateRequestInfoULFR2-r15    SEQUENCE |
| (SIZE(1..maxNrofSCells)) OF SCellIndex |
| reducedmaxPower    SEQUENCE { |
| reducedmaxPowerFR1    INTEGER (0..Z1), |
| reducedmaxPowerFR2    INTEGER (0..Z2) |
|   } OPTIONAL, |
| or |
| reducedmaxPower    SEQUENCE { |
| reducedmaxPower    INTEGER (0..Z1), |
|   } OPTIONAL, |
| or |
| reducedmaxPower    SEQUENCE { |
| reducedmaxPowerperCC    SEQUENCE (SIZE(1..maxNrofSCells)) OF SCellIndex |
|   } OPTIONAL, |
| -- ASN1STOP |

Table 2 may represent the first message (UE assistance information) that the electronic device 100 transmits to the base station 10 according to an embodiment.

Figure 5:
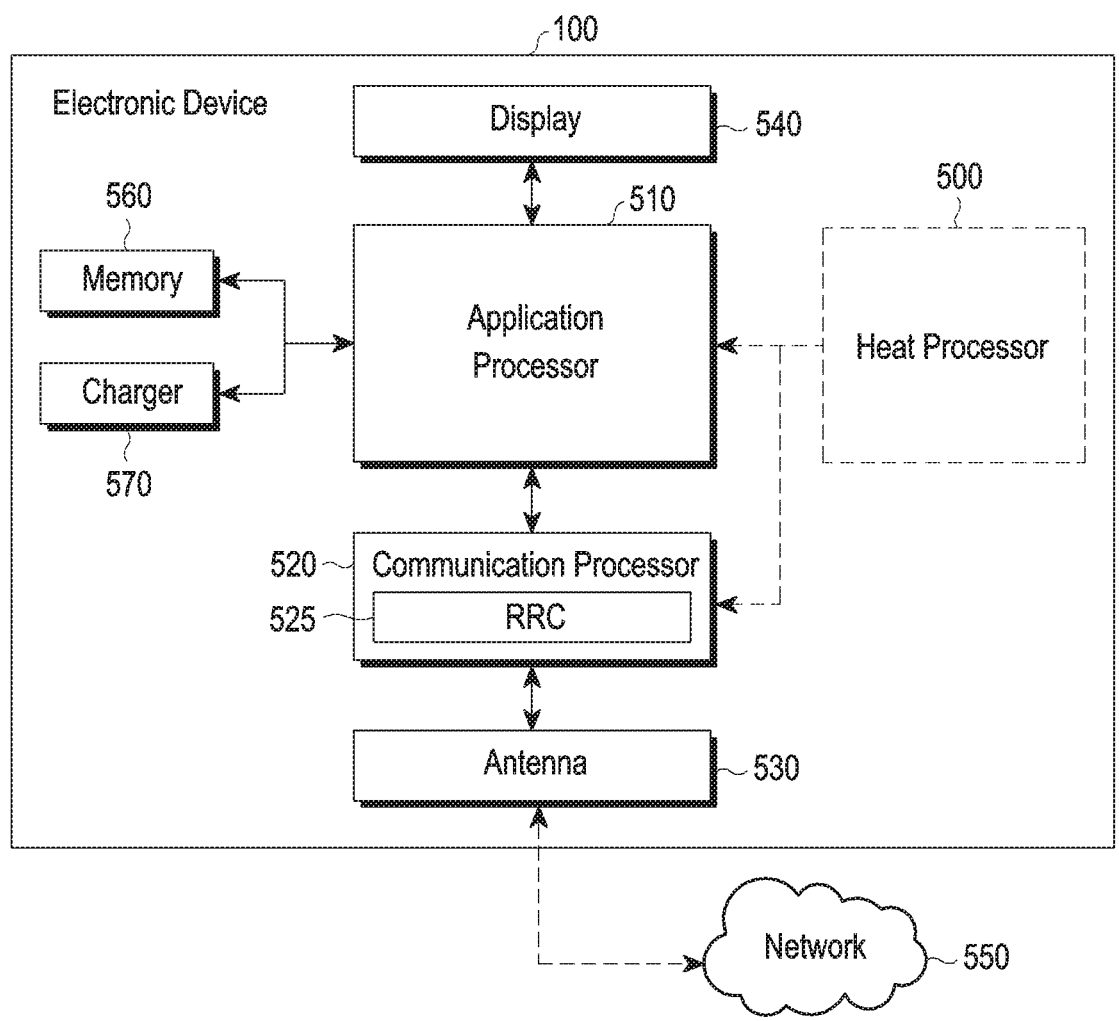
FIG. 5 is block diagram illustrating an electronic device according to an embodiment of the disclosure.

FIG. 5 is a block diagram illustrating an electronic device according to an embodiment of the disclosure.

Figure 6:
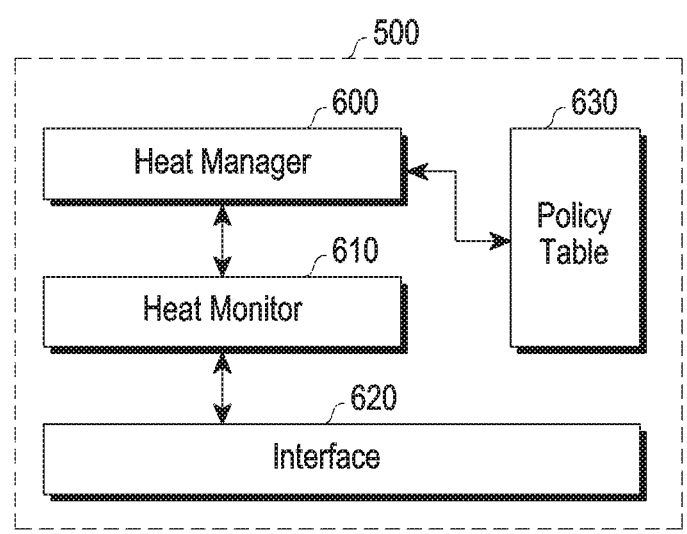
FIG. 6 is block diagram illustrating an electronic device according to an embodiment of the disclosure.

FIG. 6 is a block diagram illustrating an electronic device according to an embodiment of the disclosure.

Referring to FIG. 5, the electronic device 100 may include a heat processor 500 and an AP 510 (e.g., the processor 120 of FIG. 1A). According to an embodiment, the electronic device 100 may further include a display 540, a CP 520 (e.g., the wireless communication module 192 of FIG. 1A, the first CP 212 or second CP 214 of FIG. 1B), an antenna 530, a memory 560, and a charger integrated circuit (IC) 570. For example, the CP 520 may include an RRC 525. The RRC 525 may include a protocol stack for establishing an RRC connection with the base station 10 and generating RRC messages communicated with the base station 10. For example, the memory 560 may store software code including a plurality of instructions executable by the AP 510. According to an embodiment, the AP 510 of the electronic device 100 may detect internal overheat, but embodiments of the disclosure are not limited thereto. For example, the CP 520 of the electronic device 100 may detect internal overheat. The AP 510 and the CP 520 of the electronic device 100 may detect internal overheat. In an example, the electronic device 100 may communicate with a network 550 via the antenna 530.

According to an embodiment, the electronic device 100 may include the heat processor 500. The heat processor 500 may be implemented in software and be loaded and executed by at least one of the AP 510 or CP 520. The heat processor 500 may directly or indirectly perform an operation for removing or mitigating the overheat inside the electronic device 100.

Referring to FIG. 6, the heat processor 500 of the electronic device 100 may include a heat manager 600, a heat monitor 610, an interface 620, and a policy table 630.

According to an embodiment, the heat manager 600 may determine a threshold temperature and output the threshold temperature to the policy table 630. The threshold temperature may be a temperature at which the electronic device 100 may be overheated. According to an embodiment, the heat manager 600 may determine the threshold temperature. According to an embodiment, the heat manager 600 may compare a representative temperature determined by the heat monitor 610 with the threshold temperature included in the policy table 630, thereby determining whether heat is generated. According to an embodiment, upon detecting heat, the heat manager 600 may determine to perform at least one or more operations for removing or mitigating overheat, which are included in the policy table 630. According to an embodiment, the heat manager 600 may instruct to perform an operation for removing the overheat in the module from which heat has been detected as an operation for removing overheat which is included in the policy table 630. According to an embodiment, the heat manager 600 may instruct the CP 520 to perform an operation associated with the operation for removing overheat in the electronic device 100 as an operation for removing overheat, which is included in the policy table 630.

According to an embodiment, the heat monitor 610 may determine the representative temperature. For example, the heat monitor 610 may determine the representative temperature by combining the temperatures measured from at least one of the battery, AP, CP, and RF of the electronic device 100. According to an embodiment, the heat monitor 610 may transfer the determined representative temperature to the heat manager 600.

According to an embodiment, the representative temperature may be the external surface temperature of the electronic device 100. For example, the heat monitor 610 may calculate the external surface temperature by modeling or using a mean or weighted mean function based on the real measurements.

According to an embodiment, the policy table 630 may be included in the electronic device 100. For example, the policy table 630 may be stored in the memory. According to an embodiment, the policy table 630 may include information about the manufacturers of the components that may overheat or information about the threshold temperature per model. For example, the components in the electronic device 100 which may be overheated may include the battery, AP, CP, and antenna module. According to an embodiment, the policy table 630 may include the threshold temperature determined by the heat manager 600.

According to an embodiment, the policy table 630 may include offset information for the threshold temperature. For example, if the electronic device 100 determines that a rapid action is required to remove overheat, the electronic device 100 may adjust the threshold temperature to a temperature reduced as much as the predetermined offset and reduce the heat in the electronic device 100 using the temperature adjusted based on the offset. For example, in the case of ultra-reliable and low latency communication (URLLC), the electronic device 100 may determine that a rapid action is required to address overheat. Various relevant embodiments are described below.

Figure 7A:
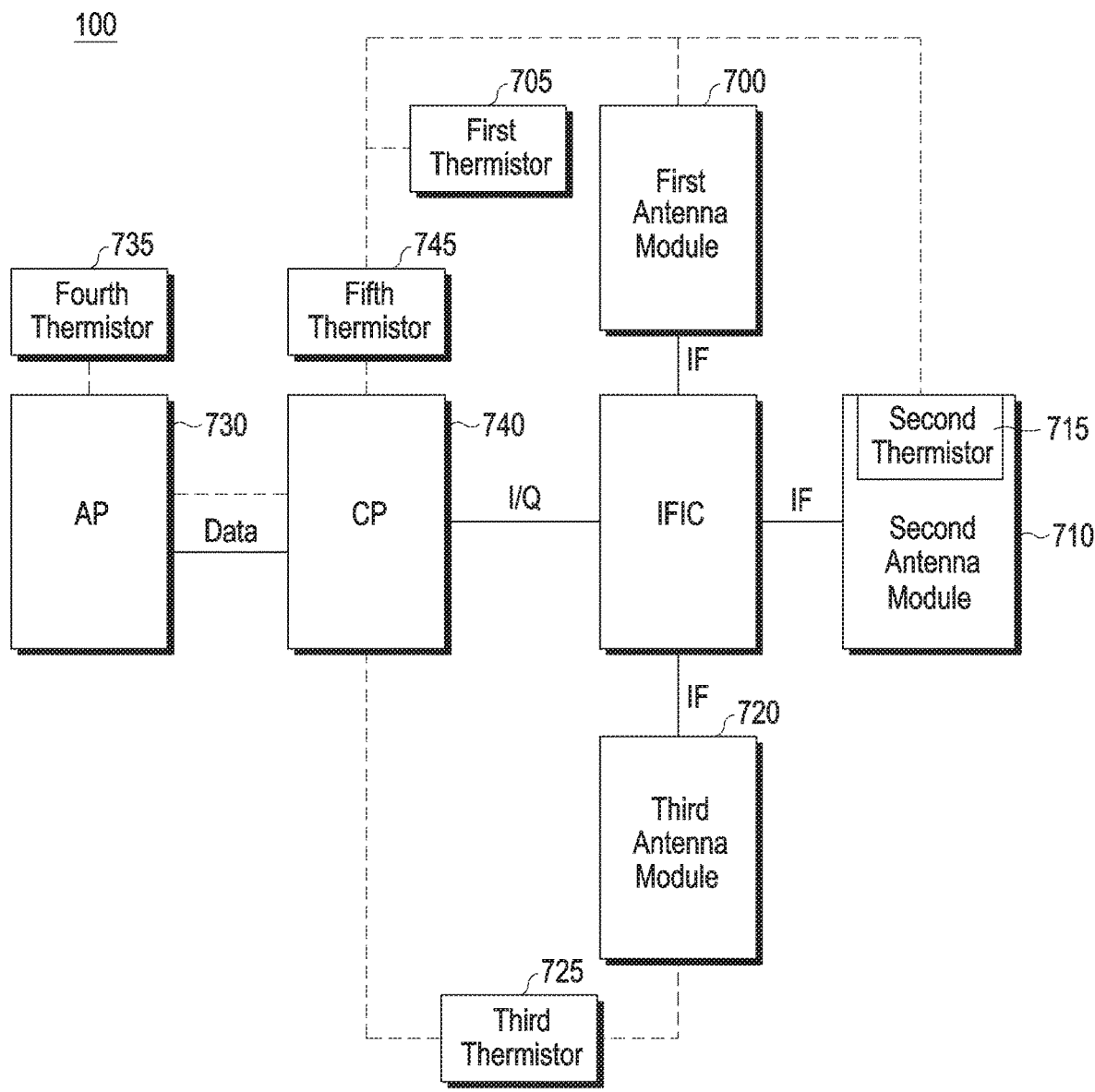
FIG. 7A is a view illustrating thermistors of an electronic device according to an embodiment of the disclosure.

FIG. 7A is a view illustrating thermistors of an electronic device according to an embodiment of the disclosure.

Referring to FIG. 7A, the electronic device 100 may include an intermediate frequency integrated circuit (IFIC), a first antenna module 700, a second antenna module 710, a third antenna module 720, an AP 730, and a CP 740.

According to an embodiment, the electronic device 100 may include a first thermistor 705 connected with the first antenna module 700, a second thermistor 715 connected with the second antenna module 710, a third thermistor 725 connected with the third antenna module 720, a fourth thermistor 735 connected with the AP 730, and a fifth thermistor 745 connected with the CP 740. According to an embodiment, the temperatures measured by the thermistors 705, 715, 725, 735, and 745 may be transferred to a heat monitor (e.g., 610 of FIG. 6) for use in determining a representative temperature. For example, the thermistors 705, 715, 725, 735, and 745 may be semiconductor elements or devices that measure temperature via the electrical resistance which varies as the temperature changes.

According to an embodiment, the electronic device 100 may measure the temperature of the first antenna module 700 using the first thermistor 705. According to an embodiment, the electronic device 100 may measure the temperature of the second antenna module 710 using the second thermistor 715. According to an embodiment, the electronic device 100 may measure the temperature of the third antenna module 720 using the third thermistor 725. According to an embodiment, the electronic device 100 may measure the temperature of the AP 730 using the fourth thermistor 735. According to an embodiment, the electronic device 100 may measure the temperature of the CP 740 using the fifth thermistor 745.

According to an embodiment, the electronic device 100 may compare a predetermined threshold temperature with any one of the temperatures of the first antenna module 700, the second antenna module 710, the third antenna module 720, the AP 730, and the CP 740 measured using one or more of the first thermistor 705, the second thermistor 715, the third thermistor 725, the fourth thermistor 735, and the fifth thermistor 745. For example, the electronic device 100 may measure the temperature of the first antenna module 700 using the first thermistor 705 and compare the measured temperature of the first antenna module 700 with the predetermined threshold temperature. When the measured temperature of the first antenna module 700 is the predetermined threshold temperature or more, the electronic device 100 may determine that the first antenna module 700 is in the overheated state.

Figure 7B:
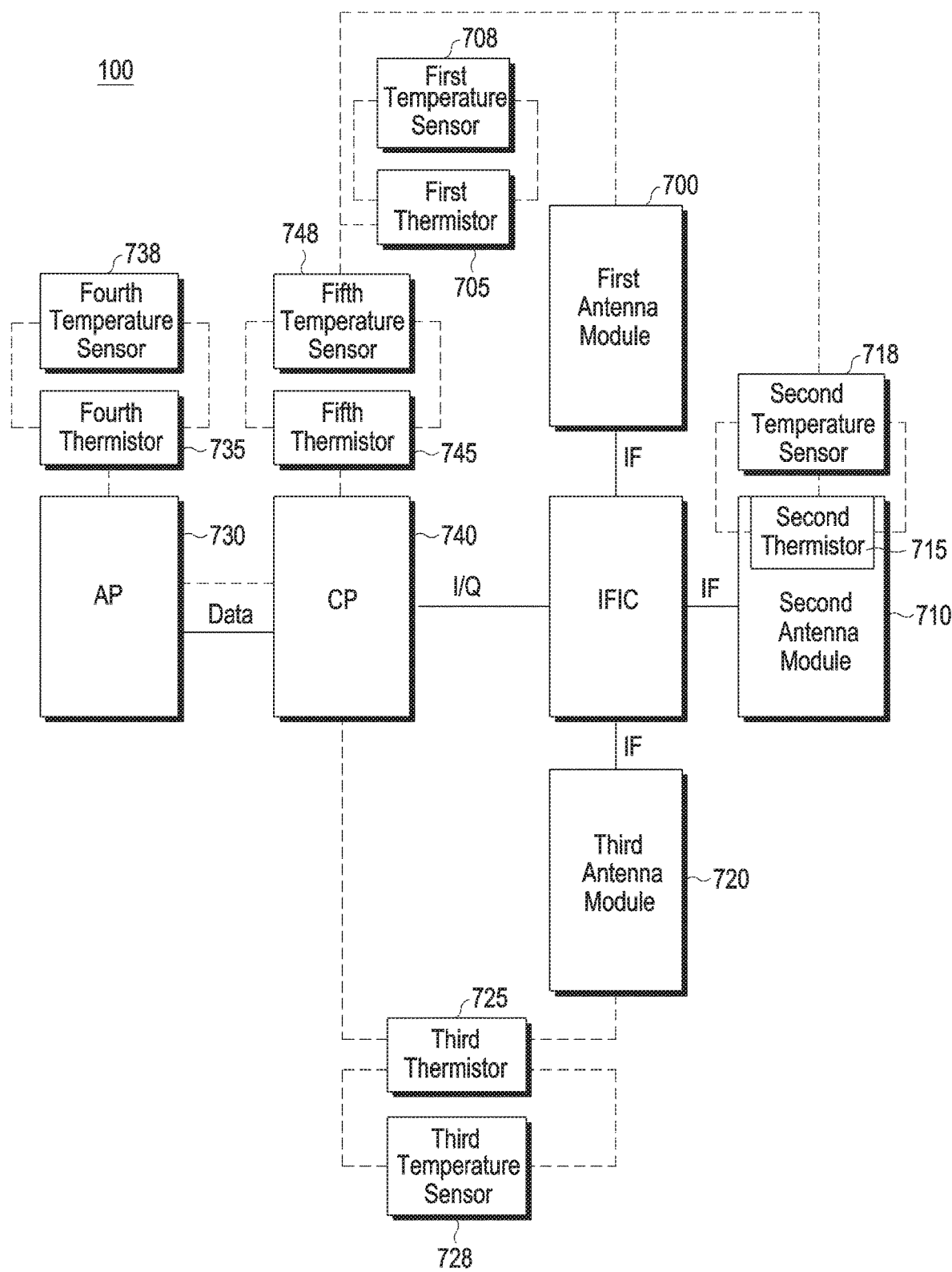
FIG. 7B is a view illustrating thermistors of an electronic device according to an embodiment of the disclosure.

FIG. 7B is a view illustrating thermistors of an electronic device according to an embodiment of the disclosure.

Referring to FIG. 7B, the electronic device 100 may include a first temperature sensor 708 connected in parallel with the first thermistor 705, a second temperature sensor 718 connected in parallel with the second thermistor 715, a third temperature sensor 728 connected in parallel with the third thermistor 725, a fourth temperature sensor 738 connected in parallel with the fourth thermistor 735, and a fifth temperature sensor 748 connected in parallel with the fifth thermistor 745. According to an embodiment, the temperatures measured by the thermistors 705, 715, 725, 735, and 745 may be transferred to a heat monitor (e.g., 610 of FIG. 6) for use in determining a representative temperature. For example, the thermistors 705, 715, 725, 735, and 745 may be semiconductor elements or devices that measure temperature via the electrical resistance which varies as the temperature changes. For example, the temperature sensors 708, 718, 728, 738, and 748 may include bi-metal thermometers, pressure thermometers, or any other temperature sensors capable of measuring temperature.

According to an embodiment, the electronic device 100 may measure the temperature of the first antenna module 700 using the first thermistor 705 and the first temperature sensor 708. According to an embodiment, the electronic device 100 may measure the temperature of the second antenna module 710 using the second thermistor 715 and the second temperature sensor 718. According to an embodiment, the electronic device 100 may measure the temperature of the third antenna module 720 using the third thermistor 725 and the third temperature sensor 728. According to an embodiment, the electronic device 100 may measure the temperature of the AP 730 using the fourth thermistor 735 and the fourth temperature sensor 738. According to an embodiment, the electronic device 100 may measure the temperature of the CP 740 using the fifth thermistor 745 and the fifth temperature sensor 748.

According to an embodiment, the electronic device 100 may compare a predetermined threshold temperature with any one of the temperatures of the first antenna module 700, the second antenna module 710, the third antenna module 720, the AP 730, and the CP 740 measured using one or more of the first thermistor 705 and the first temperature sensor 708, the second thermistor 715 and the second temperature sensor 718, the third thermistor 725 and the third temperature sensor 728, the fourth thermistor 735 and the fourth temperature sensor 738, and the fifth thermistor 745 and the fifth temperature sensor 748. For example, the electronic device 100 may measure the temperature of the first antenna module 700 using the first thermistor 705 and the first temperature sensor 708 and compare the measured temperature of the first antenna module 700 with the predetermined threshold temperature. When the measured temperature of the first antenna module 700 is the predetermined threshold temperature or more, the electronic device 100 may determine that the first antenna module 700 is in the overheated state.

Figure 8:
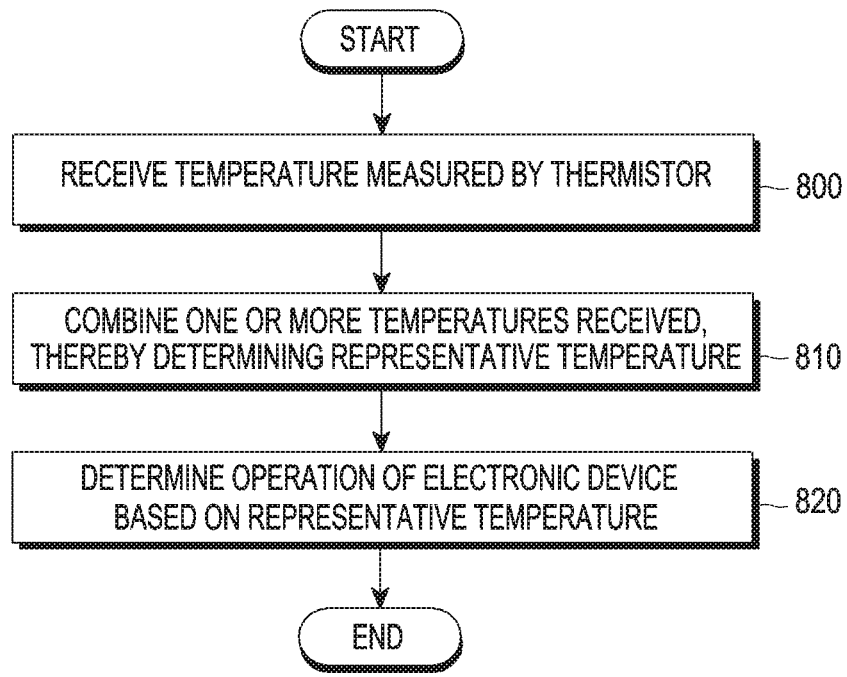
FIG. 8 is a flowchart illustrating an example of measuring and controlling an internal temperature by an electronic device according to an embodiment of the disclosure.

FIG. 8 is a flowchart illustrating an example of measuring and controlling an internal temperature by an electronic device according to an embodiment of the disclosure.

Referring to FIG. 8, according to an embodiment, in operation 800, the heat monitor 610 of the electronic device 100 may receive temperatures measured by, and from, at least one of a thermistor connected with the battery, a thermistor connected with the AP, a thermistor connected with the CP, and a thermistor connected with the RF.

According to an embodiment, in operation 810, the heat monitor 610 may combine one or more of the received temperatures of the internal components, thereby determining a representative temperature. According to an embodiment, the representative temperature may be the mean of the received temperatures of the internal components. According to an embodiment, the representative temperature may be the weighted mean of the received temperatures of the internal components. According to an embodiment, the representative temperature may be obtained by performing predetermined modeling on the combination of the received temperatures of the internal components. For example, the representative temperature may be the external surface temperature of the electronic device 100. According to an embodiment, the heat monitor 610 may transfer the determined representative temperature to the heat manager 600.

According to an embodiment, in operation 820, the heat manager 600 may determine an operation of the electronic device 100 based on the received representative temperature. According to an embodiment, the heat manager 600 may compare the received representative temperature with the threshold temperature stored in the policy table 630, thereby determining the operation of the electronic device 100. For example, if the received representative temperature is higher than the threshold temperature stored in the policy table 630, the heat manager 600 may restrict all or some of the functions of the application or internal components of the electronic device 100. According to an embodiment, the threshold temperature stored in the policy table 630 may be adjusted as much as a preset offset depending on the application or internal component running on the electronic device 100.

According to an embodiment, for the threshold temperature, the heat manager 600 may set at least one or more temperatures as offsets depending on the service state (URLLC offset, Service 1 or Service 2).

TABLE 3

| | threshold temperature | Case 1 (URLLC offset) | Case 2 (Service 1) | Case 3 (Service 2) |
|---|---|---|---|---|
| external surface temperature value | 38° C. | −4 | +2 | +2 |
| Battery thermistor | 94° C. | −9 | +5 | +5 |
| AP thermistor | 94° C. | −9 | +5 | +5 |
| CP thermistor | 88° C. | −8 | — | — |
| RF thermistor | 100° C. | −10 | — | +5 |

Table 3 represents an example in which the electronic device sets an offset to the threshold temperature according to an embodiment.

According to an embodiment, the threshold temperature may be set to differ per internal component of the electronic device 100. According to an embodiment, the threshold temperature may be set to differ depending on the scheme of calculating the representative temperature.

According to an embodiment, the electronic device 100 may set an offset for the threshold temperature for use to identify overheat in the electronic device 100. According to an embodiment, in the case of performing URLLC communication, the electronic device 100 may determine that a rapid action is required to release the overheat, setting an offset on the threshold temperature. For example, the electronic device 100 may set 10% of the preset threshold temperature as an offset.

According to an embodiment, when the external surface temperature measured on the electronic device 100 is 38° C., the electronic device 100 may determine that overheat has occurred. In this case, the threshold temperature for the external surface is 38° C. According to an embodiment, when the temperature measured by the battery thermistor of the electronic device 100 is 94° C., the electronic device 100 may determine that the UE overheat has occurred from the battery. In this case, the threshold temperature for the battery is 94° C. According to an embodiment, when the temperature measured by the AP thermistor of the electronic device 100 is 94° C., the electronic device 100 may determine that the UE overheat has occurred from the AP. In this case, the threshold temperature for the AP is 94° C. According to an embodiment, when the temperature measured by the CP thermistor of the electronic device 100 is 88° C., the electronic device 100 may determine that the UE overheat has occurred from the CP. In this case, the threshold temperature for the CP is 88° C. According to an embodiment, when the temperature measured by the RF thermistor of the electronic device 100 is 100° C., the electronic device 100 may determine that the UE overheat has occurred from the RF. In this case, the threshold temperature for the RF is 100° C. According to an embodiment, when the temperature measured by the RF thermistor of the electronic device 100 is 90° C., and the temperature measured by the CP thermistor of the electronic device 100 is 80° C., the heat monitor 610 may determine that the surface temperature has been measured as 38° C. based on the measurements. Since the surface temperature reaches the threshold temperature, the electronic device 100 may determine that the UE overheat has occurred.

According to an embodiment, under the context where a rapid action is determined to be highly needed to release the overheat, the electronic device 100 may set an offset of −4° C. for the threshold temperature of the external surface. In this case, the threshold temperature for the external surface is 34° C. Under the context where a rapid action is determined to be highly needed to release the overheat, the electronic device 100 may set an offset of −9° C. for the threshold temperature of the battery. In this case, the threshold temperature for the battery is 85° C. Under the context where a rapid action is determined to be highly needed to release the overheat, the electronic device 100 may set an offset of −9° C. for the threshold temperature of the AP. In this case, the threshold temperature for the AP is 85° C. Under the context where a rapid action is determined to be highly needed to release the overheat, the electronic device 100 may set an offset of −8° C. for the threshold temperature of the CP. In this case, the threshold temperature for the CP is 80° C. Under the context where a rapid action is determined to be highly needed to release the overheat, the electronic device 100 may set an offset of −10° C. for the threshold temperature of the RF. In this case, the threshold temperature for the RF is 90° C. According to an embodiment, the context where the electronic device 100 determines that a rapid action is highly needed to release overheat may be when the UE is using the URLLC service. According to an embodiment, the context where the electronic device 100 determines that a rapid action is highly needed to release overheat may be when the UE is using real-time video service.

According to an embodiment, under the context where a rapid action is determined to be not needed to release the overheat, the electronic device 100 may set an offset for the threshold temperature. For example, under the context where a rapid action is determined to be not needed to release the overheat, the electronic device 100 may set an offset of +2° C. for the threshold temperature of the external surface. In this case, the threshold temperature for the external surface is 40° C. Under the context where a rapid action is determined to be not needed to release the overheat, the electronic device 100 may set an offset of +5° C. for the threshold temperature of the battery. In this case, the threshold temperature for the battery is 99° C. Under the context where a rapid action is determined to be less needed to release the overheat, the electronic device 100 may set an offset of +5° C. for the threshold temperature of the AP. In this case, the threshold temperature for the AP is 99° C. Under the context where a rapid action is determined to be not needed to release the overheat, the electronic device 100 may set an offset of +5° C. for the threshold temperature of the RF. In this case, the threshold temperature for the RF is 105° C. According to an embodiment, the context where the electronic device 100 determines that a rapid action is highly needed to release overheat may be when the UE is playing a video service.

Referring to FIG. 8, according to an embodiment, in operation 820, the electronic device 100 may determine an action for releasing overheat based on the representative temperature.

According to an embodiment, when the determined temperature is equal to or higher than the threshold temperature, the electronic device 100 may restrict the performance of an internal component or some functions of the application operated on the internal component. For example, the AP 510 of the electronic device 100 may limit the performance of the internal component that has overheated or some functions of the application operated on the internal component. For example, the CP 520 of the electronic device 100 may limit the performance of the internal component that has overheated or some functions of the application operated on the internal component. The CP 520 of the electronic device 100 may transmit information about the operation of limiting the performance of the overheated internal component to the base station. For example, the information about the performance limiting operation may be overheat assistance information (OverheatingAssistance). For example, the AP 510 and/or the CP 520 of the electronic device 100 may limit the performance of the internal component that has overheated or some functions of the application operated on the internal component.

Figure 9:
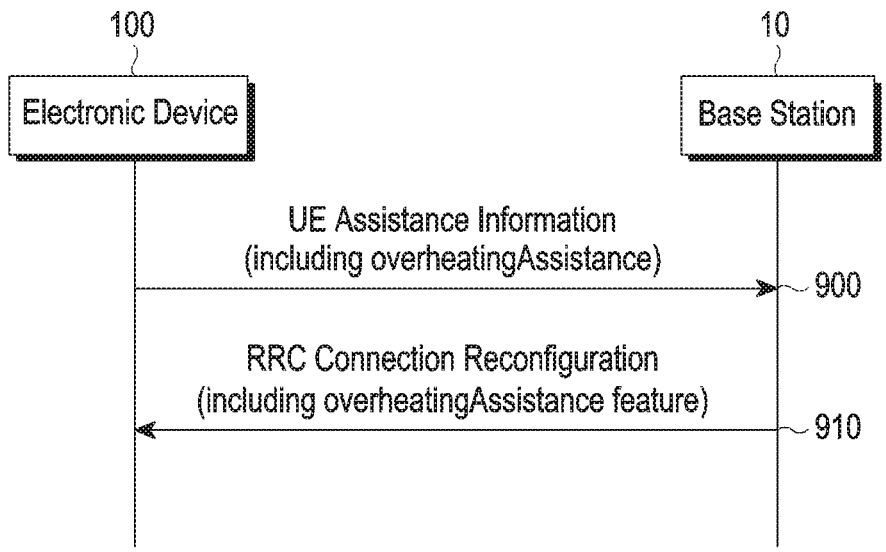
FIG. 9 is a view illustrating examples of transmission/reception between an electronic device and a base station according to an embodiment of the disclosure.

FIG. 9 is a view illustrating examples of transmission/reception between an electronic device and a base station according to an embodiment of the disclosure.

Figure 10A:
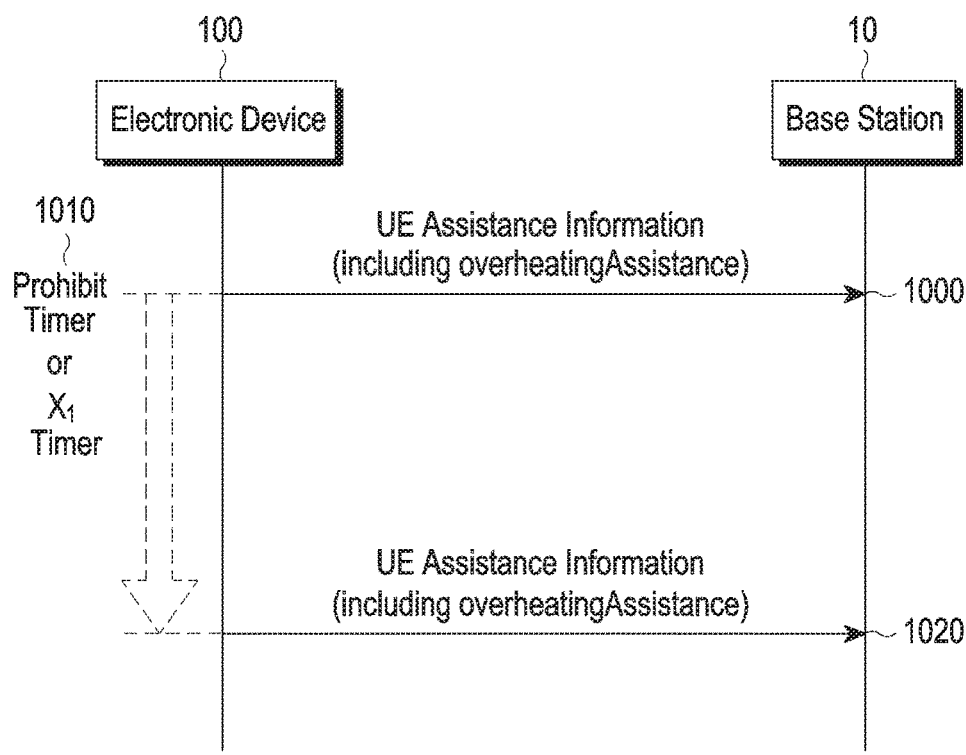
FIG. 10A is a view illustrating examples of transmission/reception between an electronic device and a base station according to an embodiment of the disclosure.

FIG. 10A is a view illustrating examples of transmission/reception between an electronic device and a base station according to an embodiment of the disclosure.

Figure 10B:
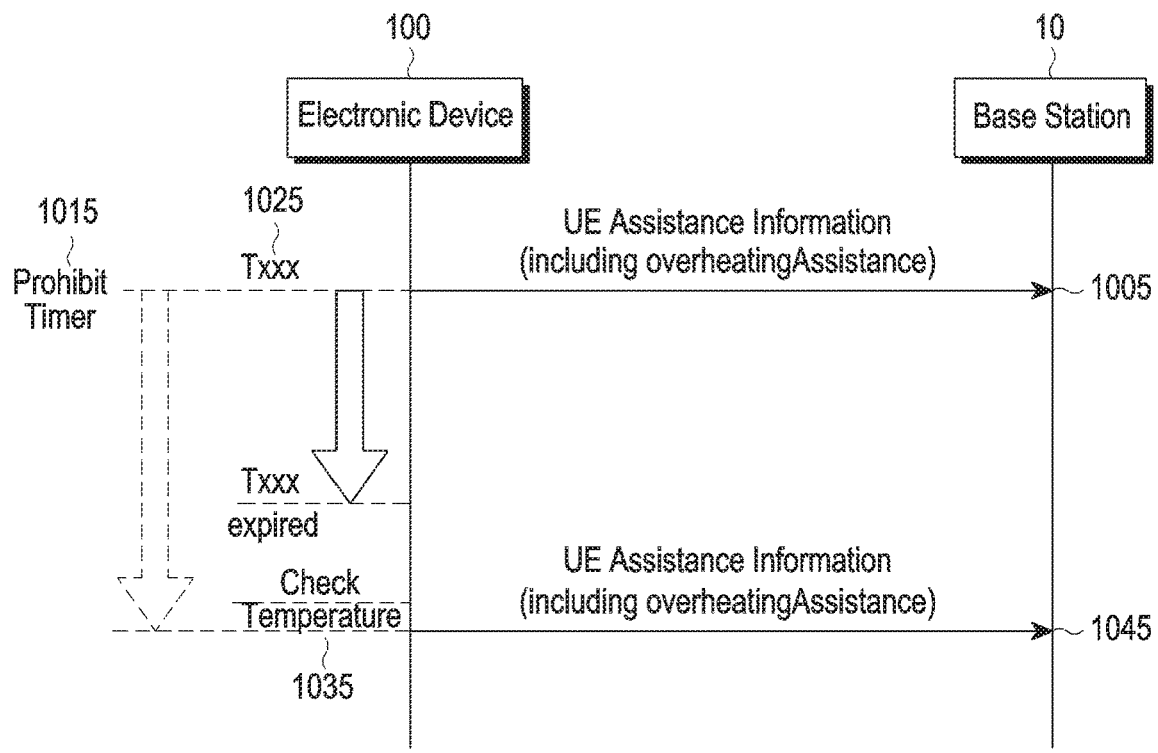
FIG. 10B is a view illustrating examples of transmission/reception between an electronic device and a base station according to an embodiment of the disclosure.

FIG. 10B is a view illustrating examples of transmission/reception between an electronic device and a base station according to an embodiment of the disclosure.

Referring to FIG. 9, an example is illustrated in which the base station 10 transmits a third message (RRCConnectionReconfiguration) to the electronic device 100 in response to the first message (UE assistance information) transmitted from the electronic device 100 to the base station 10.

According to an embodiment, in operation 900, the electronic device 100 may transmit the first message (UE assistance information) to the base station 10. For example, the first message (UE assistance information) may include overheat assistance information (OverheatingAssistance) generated in response to the electronic device 100 identifying the overheat.

According to an embodiment, upon receiving the first message (UE assistance information) from the electronic device 100, the base station 10 may determine whether to accept or disregard the request from the electronic device 100 corresponding to the overheat assistance information (OverheatingAssistance) in the first message (UE assistance information).

According to an embodiment, upon accepting the request from the electronic device 100 corresponding to the overheat assistance information (OverheatingAssistance), the base station 10 may reset the resources for the electronic device 100 based on the resource corresponding to the overheat assistance information (OverheatingAssistance).

For example, the overheat assistance information (OverheatingAssistance) may include the information for the reduced maximum bandwidth (reducedMaxBW-FR1) of the first frequency range (FR1) or the information for the reduced maximum bandwidth (reducedMaxBW-FR2) of the second frequency range (FR2). Upon accepting the request from the electronic device 100, the base station 10 may determine to reallocate the frequency resource corresponding to the information about the reduced maximum bandwidth (reducedMaxBW-FR1) of the first frequency range (FR1) or the information about the reduced maximum bandwidth (reducedMaxBW-FR2) of the second frequency range (FR2) as the resource allocated to the electronic device 100.

For example, the overheat assistance information (OverheatingAssistance) may include the information for the reduced maximum bandwidth (reducedMaxBW-FR1) of the first frequency range (FR1) or the information for the reduced maximum bandwidth (reducedMaxBW-FR2) of the second frequency range (FR2).

According to an embodiment, upon accepting the request from the electronic device 100, the base station 10 may reduce the maximum bandwidth of the first frequency range (FR1) to the reduced maximum bandwidth (reducedMaxBW-FR1) of the first frequency range (FR1) and reduce the maximum bandwidth of the second frequency range (FR2) to the reduced maximum bandwidth (reducedMaxBW-FR2) of the second frequency range (FR2).

According to an embodiment, the electronic device 100 may set each of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) to one of a plurality of bandwidths including 0 MHz. For example, "the bandwidth of the second frequency range (FR2) is 0 MHz" may indicate that the electronic device 100 is not to use the second frequency range (FR2). For example, "the bandwidth of the second frequency range (FR2) is 0 MHz" may mean that the electronic device 100 intends to inactivate (sleep or deactivate) the components corresponding to the second frequency range (FR2).

According to an embodiment, when the base station 10 accepts the request from the electronic device 100, each of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) which are included in the request from the electronic device 100 accepted by the base station 10 may correspond to 0 MHz. For example, based on the bandwidth of the second frequency range (FR2) being 0 MHz, the base station 10 may determine that the electronic device 100 does not want to use the second frequency range (FR2).

According to an embodiment, when at least one of the information indicating the reduced maximum bandwidth (reducedBW-FR2-DL) of the downlink of the second frequency range (FR2) and the information indicating the reduced maximum bandwidth (reducedBW-FR2-UL) of the uplink of the second frequency range (FR2) is identified as corresponding to 0 MHz, the base station 10 may determine not to allocate the downlink of the second frequency range (FR2) or the uplink of the second frequency range (FR2) allocated to the electronic device 100.

For example, the overheat assistance information (OverheatingAssistance) may include information about the reduced maximum MIMO rank count (reducedMaxMIMO-LayersFR1) of the first frequency range (FR1) or information about the reduced maximum MIMO rank count (reducedMaxMIMO-LayersFR2) of the second frequency range (FR2). Upon accepting the request from the electronic device 100, the base station 10 may determine to reallocate the frequency resource corresponding to the information about the reduced maximum MIMO rank count (reducedMaxMIMO-LayersFR1) of the first frequency range (FR1) or the information about the reduced maximum MIMO rank count (reducedMaxMEVIO-LayersFR2) of the second frequency range (FR2) as the resource allocated to the electronic device 100.

According to an embodiment, in operation 910, the electronic device 100 may receive, from the base station 10, a third message (RRCConnectionReconfiguration) containing the frequency resource reallocated to the electronic device 100 or the MIMO rank count reallocated to the electronic device 100.

For example, the overheat assistance information (OverheatingAssistance) may include information about the reduced maximum component carrier (CC) count of the UE's carrier aggregation (CA) combination. Upon accepting the request from the electronic device 100, the base station 10 may determine to set the CC count of the CA combination set on the electronic device 100 as the number of CC combinations corresponding to the reduced maximum count information (reducedMaxCCs).

According to an embodiment, in operation 910, the electronic device 100 may receive, from the base station 10, the third message (RRCConnectionReconfiguration) containing the configuration information about the number of CCs of the CA combination reallocated to the electronic device 100.

For example, the overheat assistance information (OverheatingAssistance) may include the information for the reduced maximum transmission power (reducedmaxPowerFR1) of the first frequency range (FR1) or the information for the reduced maximum transmission power (reducedmaxPower-FR2) of the second frequency range (FR2). Upon accepting the request from the electronic device 100, the base station 10 may determine to set the maximum transmission power corresponding to the information about the reduced maximum transmission power (reducedmaxPowerFR1) of the first frequency range (FR1) or the information about the reduced maximum transmission power (reducedmaxPowerFR2) of the second frequency range (FR2) as the resource allocated to the electronic device 100.

According to an embodiment, in operation 910, the electronic device 100 may receive, from the base station 10, the third message (RRCConnectionReconfiguration) containing the information about the maximum transmission power reallocated to the electronic device 100.

For example, the overheat assistance information (OverheatingAssistance) may include information about a secondary cell release request (SCellReleaseRequestInfoFR1) for the first frequency range (FR1) or information about a secondary cell release request (SCellReleaseRequestInfoFR2) for the second frequency range (FR2). The base station 10 may determine to release the secondary cell of the first frequency range (FR1) or the secondary cell of the second frequency range (FR2) for the electronic device 100.

According to an embodiment, in operation 910, the electronic device 100 may receive, from the base station 10, the third message (RRCConnectionReconfiguration) containing the secondary cell release information for the electronic device 100.

For example, the third message (RRCConnectionReconfiguration) may include information related to the reduced maximum bandwidth of the first frequency range (FR1) or information related to the reduced maximum bandwidth of the second frequency range (FR2) as the frequency resource reallocated to the electronic device 100. For example, the third message (RRCConnectionReconfiguration) may include information related to the reduced maximum MIMO rank count of the first frequency range (FR1) or information related to the reduced maximum MIMO rank count of the second frequency range (FR2) as the MIMO rank count reallocated to the electronic device 100. For example, the third message (RRCConnectionReconfiguration) may include information about the CA combination reset on the electronic device 100. For example, the third message (RRCConnectionReconfiguration) may include information about the maximum transmission power reset on the electronic device 100. For example, the third message (RRCConnectionReconfiguration) may include the secondary cell release information for the first frequency range (FR1) or the secondary cell release information for the second frequency range (FR2) for the electronic device 100.

Referring to FIG. 10A, an example is illustrated in which the electronic device 100 fails to receive a response to the first message (UE assistance information) from the base station 10.

According to an embodiment, in operation 1000, the electronic device 100 may transmit the first message (UE assistance information) to the base station 10.

According to an embodiment, in operation 1010, the electronic device 100 may drive an X1 timer (X1 Timer) along with a first timer (Prohibit Timer) in response to the transmission of the first message (UE assistance information) to the base station 10. For example, the first timer (Prohibit Timer) may be a timer for controlling the transmission period of the first message (UE assistance information). For example, the X1 timer (X1 Timer) may be a timer for controlling the period of identifying whether the base station 10 responds to the first message (UE assistance information). According to an embodiment, rather than driving the X1 timer, the first timer may be driven to replace the X1 timer. According to an embodiment, upon failing to receive, from the base station 10, a response to the first message (UE assistance information) until the X1 timer (X1 Timer) expires, the electronic device 100 may determine that the base station 10 disregards the request from the electronic device 100 corresponding to the overheat assistance information (OverheatingAssistance). The response to the first message (UE assistance information) may be the third message (RRCConnectionReconfiguration) transmitted from the base station.

According to an embodiment, in operation 1020, upon failing to receive a response to the first message (UE assistance information) from the base station 10 until the X1 timer (X1 Timer) expires, the electronic device 100 may retransmit the first message (UE assistance information) to the base station 10. According to an embodiment, in the case of driving the first timer (Prohibit Timer) while replacing the X1 timer (X1 Timer), upon failing to receive a response to the first message (UE assistance information) from the base station 10 until the first timer (Prohibit Timer) expires, the electronic device 100 may retransmit the first message (UE assistance information) to the base station 10. According to an embodiment, in the case of driving the first timer (Prohibit Timer) while driving the X1 timer (X1 Timer), upon failing to receive a response to the first message (UE assistance information) from the base station 10 before the expiration time of the first timer (Prohibit Timer) or the expiration time of the X1 timer (X1 Timer) whichever is earlier, the electronic device 100 may retransmit the first message (UE assistance information) to the base station 10. According to an embodiment, in the case of driving the first timer (Prohibit Timer) while driving the X1 timer (X1 Timer), upon failing to receive a response to the first message (UE assistance information) from the base station 10 before the expiration time of the first timer (Prohibit Timer) or the expiration time of the X1 timer (X1 Timer) whichever is later, the electronic device 100 may retransmit the first message (UE assistance information) to the base station 10.

According to an embodiment, the first message (UE assistance information) retransmitted by the electronic device 100 may include overheat assistance information (OverheatingAssistance) generated in response to the electronic device 100 identifying the overheat.

According to an embodiment, the electronic device 100 may not retransmit the first message (UE assistance information) to the base station 10 from the time when the first timer (Prohibit Timer) is driven to the expiration time of the first timer (Prohibit Timer). According to an embodiment, the electronic device 100 may retransmit the first message (UE assistance information) to the base station 10 after the expiration time of the first timer (Prohibit Timer).

Referring to FIG. 10B, an example is illustrated in which the electronic device 100 fails to receive a response to the first message (UE assistance information) from the base station 10.

According to an embodiment, in operation 1005, the electronic device 100 may transmit the first message (UE assistance information) to the base station 10.

According to an embodiment, in operation 1015, the electronic device 100 may drive an X1 timer (X1 Timer) along with a first timer (Prohibit Timer) in response to the transmission of the first message (UE assistance information) to the base station 10. For example, rather than driving the X1 timer, the first timer alone may be driven to replace the X1 timer. According to an embodiment, upon failing to receive, from the base station 10, a response to the first message (UE assistance information) until the X1 timer (X1 Timer) expires, the electronic device 100 may determine that the base station 10 disregards the request from the electronic device 100 corresponding to the overheat assistance information (OverheatingAssistance).

According to an embodiment, in operation 1025, the electronic device 100 may drive a second timer (Txxx) in response to the transmission of the first message (UE assistance information) to the base station 10.

According to an embodiment, in operation 1035, the electronic device 100 may identify overheat inside the electronic device 100. According to an embodiment, the electronic device 100 may refrain from identifying whether the inside of the electronic device 100 is overheated from the time when the second timer (Txxx) is driven to the expiration time of the second timer (Txxx).

According to an embodiment, in operation 1045, upon failing to receive a response to the first message (UE assistance information) from the base station 10 until the second timer (Txxx) expires, the electronic device 100 may retransmit the first message (UE assistance information) to the base station 10 in response to the electronic device 100 identifying, in operation 1035, overheat inside the electronic device 100. The first message (UE assistance information) retransmitted by the electronic device 100 may include overheat assistance information (OverheatingAssistance) generated in response to the electronic device 100 identifying the overheat.

According to an embodiment, upon failing to identify overheat inside the electronic device 100 in operation 1035, the electronic device 100 may refrain from retransmitting the first message (UE assistance information) to the base station 10 in operation 1045. Upon determining that there is no overheat inside the electronic device 100, the electronic device 100 may refrain from retransmitting the first message (UE assistance information) to the base station 10 in operation 1045.

Figure 11:
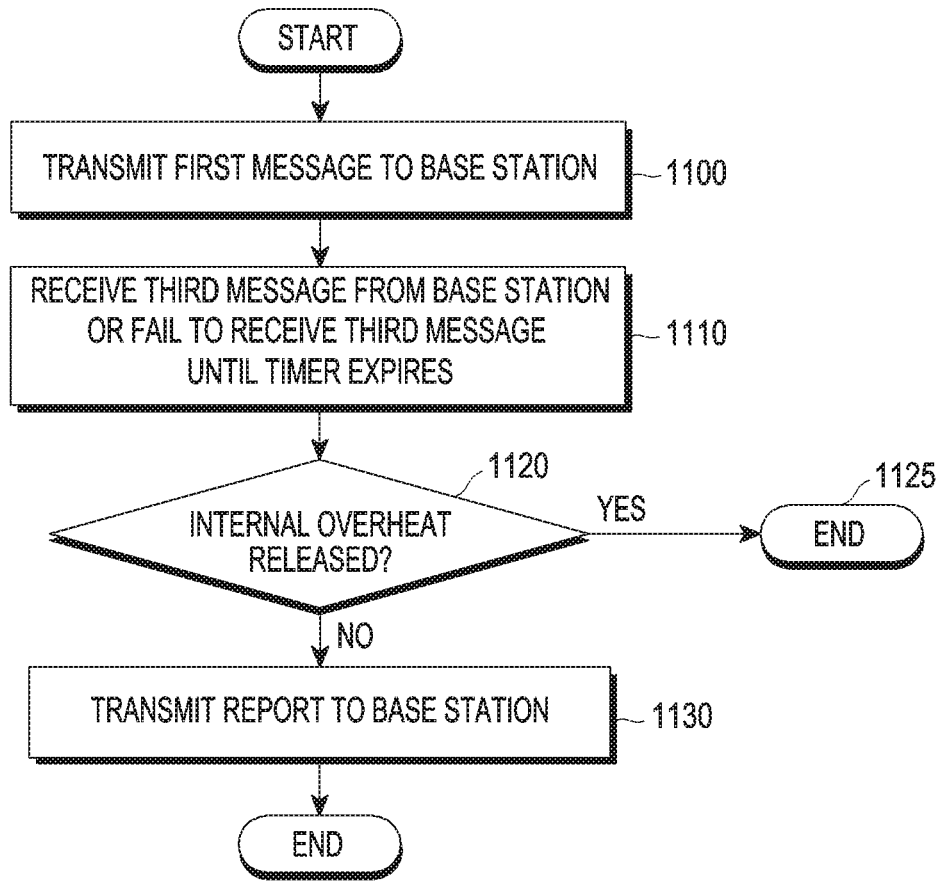
FIG. 11 is a flowchart illustrating operations of an electronic device according to an embodiment of the disclosure.

FIG. 11 is a flowchart illustrating operations of an electronic device according to an embodiment of the disclosure.

Referring to FIG. 11, according to an embodiment, in operation 1100, the electronic device 100 may transmit a first message (UE assistance information) to the base station 10.

According to an embodiment, in operation 1110, the electronic device 100 may receive a third message (RRCConnectionReconfiguration) from the base station 10 or may receive no third message (RRCConnectionReconfiguration) until the first timer (Prohibit Timer) or X1 timer (X1 Timer) expires. This is described below in greater detail.

According to an embodiment, in operation 1120, the electronic device 100 may measure the temperature of each module of the electronic device 100 or a representative temperature, thereby identifying whether overheat is released. According to an embodiment, in operation 1125, upon determining that the overheat inside the electronic device 100 is released, the electronic device 100 may terminate the algorithm. According to an embodiment, in operation 1120, the electronic device 100 may measure the temperature of each module of the electronic device 100 or representative temperature at each expiration time of the second timer (Txxx).

According to an embodiment, in operation 1130, upon determining that the overheat inside the electronic device 100 is not released, the electronic device 100 may report a channel quality indicator (CQI) value lower than the current CQI value to the base station 10.

According to an embodiment, in operation 1130, upon determining that the overheat inside the electronic device 100 is not released, the electronic device 100 may report a value lower than the actual measurement, as the measurement for the current channel state, to the base station 10. According to an embodiment, the measurement for the channel state and its reporting may be performed for layer 3 mobility.

According to an embodiment, in operation 1130, upon determining that the overheat inside the electronic device 100 is not released, the electronic device 100 may report a negative acknowledgement (NACK) to the base station 10 even for data normally received. According to an embodiment, the electronic device 100 may refrain from transmitting an acknowledgement (ACK) for data normally received (Discrete TX).

According to an embodiment, in operation 1130, upon determining that the overheat inside the electronic device 100 is not released, the physical downlink control channel (PDCCH) monitoring period for transmission by the base station 10 may be adjusted variably. For example, the electronic device 100 may set the PDCCH monitoring period as double the length set by the base station and perform PDCCH monitoring based thereupon.

According to an embodiment, in operation 1130, upon determining that the internal overheat of the electronic device 100 is not released, the electronic device 100 may determine a radio link failure state and perform an operation therefor. According to an embodiment, operations in the radio link failure state may include transmission to the base station, by the electronic device 100, of a connection reestablishment procedure request message (RRCReestablishmentRequest).

According to an embodiment, upon determining that the internal overheat of the electronic device 100 is not released in operation 1130, the electronic device 100 may transmit a secondary cell radio link failure report (SCG Failure Report) to the base station (or a primary base station or primary cell).

According to an embodiment, in operation 1130, upon determining that the overheat inside the electronic device 100 is not released, the electronic device 100 may refrain from attempting to connect to the secondary cell. According to an embodiment, refraining from attempting from connecting to the secondary cell may include refraining from transmission, by the electronic device 100, of a random-access channel (RACH) message to the secondary cell. According to an embodiment, refraining from attempting to connect to the secondary cell may include refraining from transmission, by the electronic device 100, of a result of measurement on the secondary cell to the base station. According to an embodiment, refraining from attempting to connect to the secondary cell may include refraining from transmission of a result of measurement including a value lower than the actual measurement on the secondary cell to the base station by the electronic device 100.

Figure 12A:
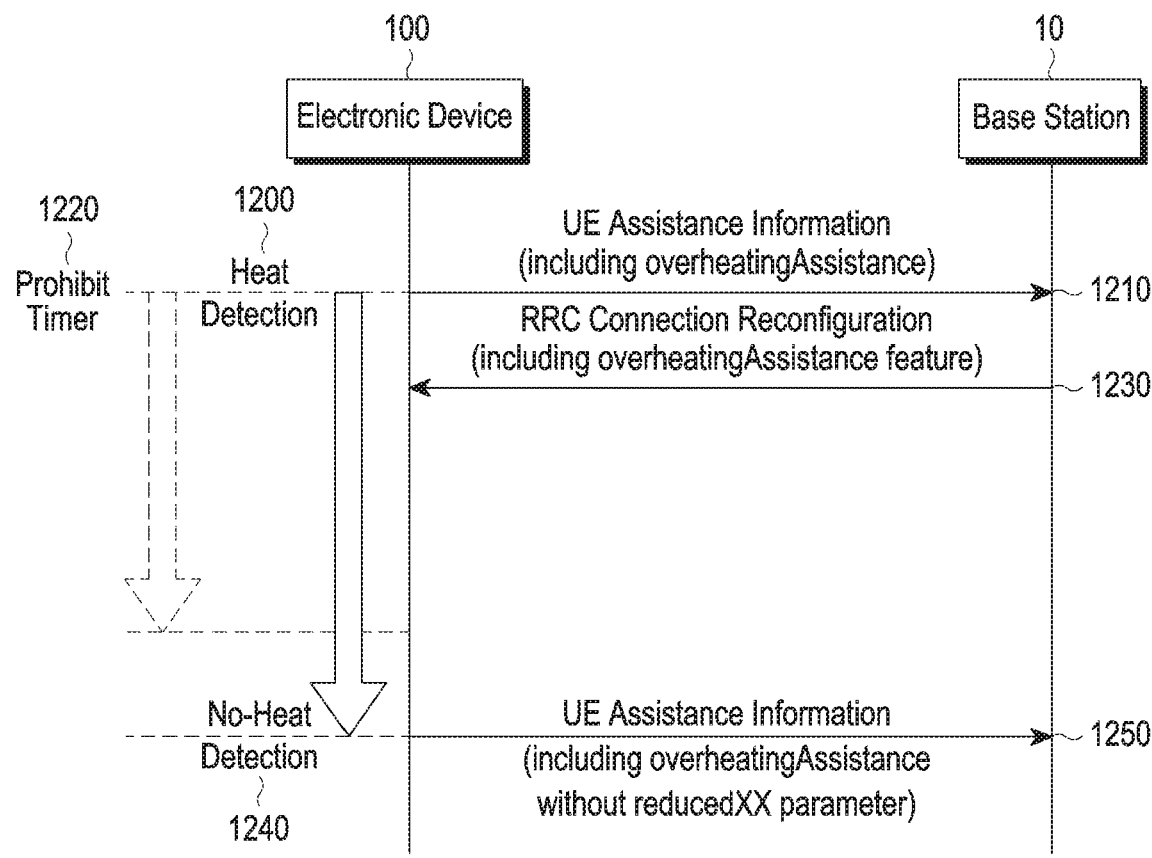
FIG. 12A is a view illustrating examples of transmission/reception between an electronic device and a base station according to an embodiment of the disclosure.

FIG. 12A is a view illustrating examples of transmission/reception between an electronic device and a base station according to an embodiment of the disclosure.

Figure 12B:
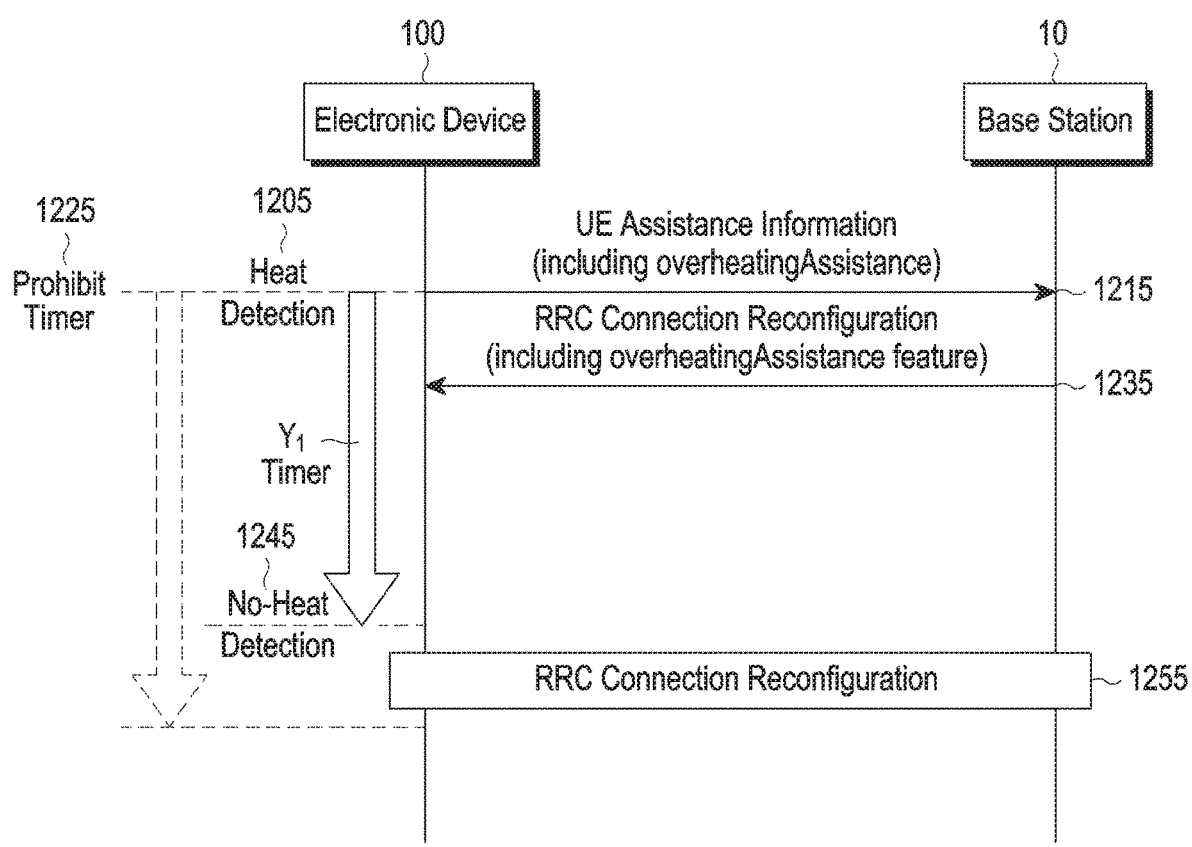
FIG. 12B is a view illustrating examples of transmission/reception between an electronic device and a base station according to an embodiment of the disclosure.

FIG. 12B is a view illustrating examples of transmission/reception between an electronic device and a base station according to an embodiment of the disclosure.

Figure 13:
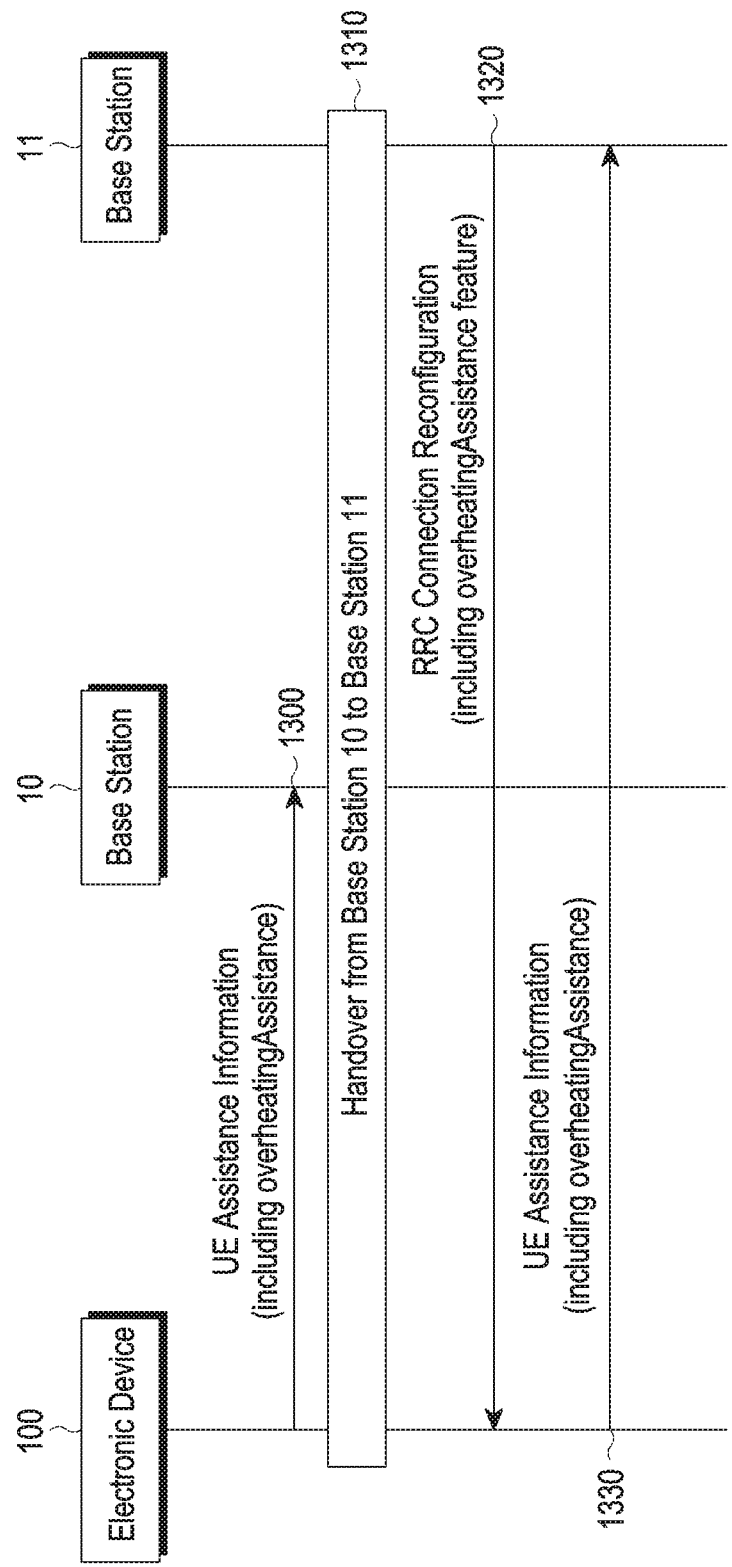
FIG. 13 is a view illustrating examples of transmission/reception between an electronic device and a base station according to an embodiment of the disclosure.

FIG. 13 is a view illustrating examples of transmission/reception between an electronic device and a base station according to an embodiment of the disclosure.

Referring to FIG. 12A, an example is illustrated of retransmitting a first message (UE assistance information) lacking overheat assistance information (OverheatingAssistance) generated in response to identifying overheat in the electronic device 100 to the base station when the overheat in the electronic device 100 is released.

According to an embodiment, in operation 1200, the electronic device 100 may identify overheat inside the electronic device 100. The electronic device 100 may generate overheat assistance information (OverheatingAssistance) in response to identifying the overheat inside the electronic device 100.

According to an embodiment, in operation 1210, the electronic device 100 may transmit, to the base station 10, a first message (UE assistance information) containing overheat assistance information (OverheatingAssistance) generated in response to the identifying operation inside the electronic device 100. According to an embodiment, the overheat assistance information (OverheatingAssistance) may include the information for the reduced maximum bandwidth (reducedMaxBW-FR1) of the first frequency range (FR1) or the information for the reduced maximum bandwidth (reducedMaxBW-FR2) of the second frequency range (FR2), which is reallocated to the electronic device 100. According to an embodiment, the overheat assistance information (OverheatingAssistance) may include information about the reduced maximum MIMO rank count (reducedMaxMIMO-LayersFR1) of the first frequency range (FR1) or information about the reduced maximum MIMO rank count (reducedMaxMIMO-LayersFR2) of the second frequency range (FR2), which is reallocated to the electronic device 100.

According to an embodiment, in operation 1220, the electronic device 100 may drive the first timer (Prohibit Timer) in response to the transmission of the first message (UE assistance information) to the base station 10. According to an embodiment, the electronic device 100 may fail to retransmit the first message (UE assistance information) to the base station 10 from the time when the first timer (Prohibit Timer) is driven to the expiration time of the first timer (Prohibit Timer).

According to an embodiment, in operation 1220, the electronic device 100 may drive a second timer (Txxx) in response to the transmission of the first message (UE assistance information) to the base station 10. According to an embodiment, the electronic device 100 may remeasure the UE's heating state after the second timer (Txxx) expires. According to an embodiment, the second timer (Txxx) may be replaced with the first timer.

According to an embodiment, in operation 1230, the electronic device 100 may receive, from the base station 10, a third message (RRCConnectionReconfiguration) containing the frequency resource reallocated to the electronic device 100 or the MIMO rank count reallocated to the electronic device 100. For example, the frequency resource reallocated to the electronic device 100 may include information related to the reduced maximum bandwidth of the first frequency range (FR1) or information related to the reduced maximum bandwidth of the second frequency range (FR2). For example, the MIMO rank count reallocated to the electronic device 100 may include information related to the reduced maximum MIMO rank count of the first frequency range (FR1) or information related to the reduced maximum MIMO rank count of the second frequency range (FR2).

According to an embodiment, in operation 1240, the electronic device 100 may identify overheat inside the electronic device 100 after the second timer (Txxx) expires. For example, in operation 1240, the electronic device 100 may determine that the overheat inside the electronic device 100 is not identified. According to an embodiment, in operation 1240, the electronic device 100 may determine that there is no overheat inside the electronic device 100.

According to an embodiment, in operation 1250, the electronic device 100 may transmit the first message (UE assistance information) to the base station 10 in response to failure to identify overheat inside the electronic device 100. According to an embodiment, the first message (UE assistance information) transmitted from the electronic device 100 to the base station 10 in response to failure to identify overheat in the electronic device 100 may include an indicator for the overheat assistance information (OverheatingAssistance) but lack limited parameters.

According to an embodiment, if the electronic device 100 is no longer in the overheat condition, the electronic device 100 may make a setting so that the reducedUE-Category and reducedMaxCCs are not included in the overheat assistance information elements (OverheatingAssistance IE) of the first message (UE assistance information) for the overheating assistance indication.

According to an embodiment, if the electronic device 100 is no longer in the overheat condition, the electronic device 100 may start the T345 timer along with the timer value for setting the overheat indication restricting timer (OverheatingIndicationProhibitTimer) while transmitting the first message (UE assistance information) for the overheating assistance indication.

According to an embodiment, upon determining that no overheat is identified inside the electronic device 100 after at least one of the first timer (Prohibit Timer) or the T1 timer expires, the electronic device 100 may transmit a first message (UE assistance information) lacking the overheat assistance information (OverheatingAssistance) to the base station 10.

According to an embodiment, upon receiving the first message (UE assistance information) lacking the overheat assistance information (OverheatingAssistance) from the electronic device 100, the base station 10 may determine that the overheat in the electronic device 100 has been released.

Referring to FIG. 12B, an example is illustrated of reestablishing an RRC connection with the base station 10 when the overheat in the electronic device 100 is released.

According to an embodiment, in operation 1205, the electronic device 100 may identify overheat inside the electronic device 100. The electronic device 100 may generate overheat assistance information (OverheatingAssistance) in response to identifying the overheat inside the electronic device 100.

According to an embodiment, in operation 1215, the electronic device 100 may transmit, to the base station 10, a first message (UE assistance information) containing overheat assistance information (OverheatingAssistance) generated in response to the identifying operation inside the electronic device 100.

According to an embodiment, in operation 1225, the electronic device 100 may drive a Y1 timer (Y1 Timer) along with a first timer (Prohibit Timer) in response to the transmission of the first message (UE assistance information) to the base station 10. According to an embodiment, the electronic device 100 may fail to retransmit the first message (UE assistance information) to the base station 10 from the time when the first timer (Prohibit Timer) is driven to the expiration time of the first timer (Prohibit Timer).

According to an embodiment, in operation 1235, the electronic device 100 may receive, from the base station 10, a third message (RRCConnectionReconfiguration) containing the frequency resource reallocated to the electronic device 100 or the MIMO rank count reallocated to the electronic device 100. For example, the frequency resource reallocated to the electronic device 100 may include information related to the reduced maximum bandwidth of the first frequency range (FR1) or information related to the reduced maximum bandwidth of the second frequency range (FR2). For example, the MIMO rank count reallocated to the electronic device 100 may include information related to the reduced maximum MIMO rank count of the first frequency range (FR1) or information related to the reduced maximum MIMO rank count of the second frequency range (FR2).

According to an embodiment, in operation 1245, when the Y1 timer expires before the first timer (Prohibit Timer) expires, the electronic device 100 may identify overheat inside the electronic device 100. For example, in operation 1245, the electronic device 100 may determine that the overheat inside the electronic device 100 is not identified. According to an embodiment, in operation 1245, the electronic device 100 may identify overheat inside the electronic device 100 periodically depending on the Y1 timer (Y1 Timer). No overheat may be determined to be in the electronic device 100.

According to an embodiment, since the first timer (Prohibit Timer) has not expired yet, the electronic device 100 may not transmit, to the base station 10, a first message (UE assistance information) lacking overheat assistance information (OverheatingAssistance) for notifying the base station that overheat in the electronic device 100 has been released.

According to an embodiment, in operation 1255, the electronic device 100 may transmit a message for reestablishing an RRC connection with the base station 10.

According to an embodiment, the electronic device 100 may switch to the idle state (IDLE state) or transmit an RRC reestablishment request message (RRCReestablishmentRequest) to the base station 10, thereby forcedly releasing the RRC connection. During the course of performing a random access procedure for establishing an RRC connection with the base station 10, the electronic device 100 may notify the base station 10 that the overheat in the electronic device 100 has been released. According to an embodiment, while performing the random access procedure, the electronic device 100 may notify the base station 10 that the overheat in the electronic device 100 has been released via a random access preamble and UL SCH.

Referring to FIG. 13, an example is illustrated of notifying a base station 11 of overheat in the electronic device 100 when the electronic device 100 is handed over from the base station 10 to the base station 11.

According to an embodiment, in operation 1300, the electronic device 100 may transmit, to the base station 10, a first message (UE assistance information) containing overheat assistance information (OverheatingAssistance) generated in response to the identifying operation inside the electronic device 100.

According to an embodiment, in operation 1310, the electronic device 100 may be handed over from the base station 10 to the base station 11. According to an embodiment, upon handover, the base station 10 may transmit, to the base station 11, information for a third message (RRCConnectionReconfiguration) generated in response to the first message (UE assistance information) from the electronic device 100.

According to an embodiment, in operation 1320, the electronic device 100 may receive the third message (RRCConnectionReconfiguration) from the post-handover base station 11. According to an embodiment, the frequency resource allocated to the electronic device 100 or the MIMO rank count allocated to the electronic device 100, which is included in the third message (RRCConnectionReconfiguration), may be the same as the frequency resource or MIMO rank count of when the overheat in the electronic device 100 is identified.

According to an embodiment, in operation 1330, the electronic device 100 may transmit, to the post-handover base station 11, a first message (UE assistance information) containing overheat assistance information (OverheatingAssistance) generated in response to the identifying operation inside the electronic device 100.

According to an embodiment, the electronic device 100 may reidentify overheat inside after hand over to the base station 11. The electronic device 100 may generate overheat assistance information (OverheatingAssistance) different from the overheat assistance information (OverheatingAssistance) generated previously in response to reidentifying overheat inside. The first message (UE assistance information) transmitted to the base station 10 after handover may include overheat assistance information (OverheatingAssistance) varied in response to reidentifying overheat inside after the handover to the base station 11.

According to an embodiment, the electronic device 100 may identify overheat inside after handover to the base station 10 or may identify that no overheat is identified in the electronic device 100. In this case, the first message (UE assistance information) transmitted to the base station 10 after the handover may not include the overheat assistance information (OverheatingAssistance) generated in response to identifying the internal overheat.

Figure 14A:
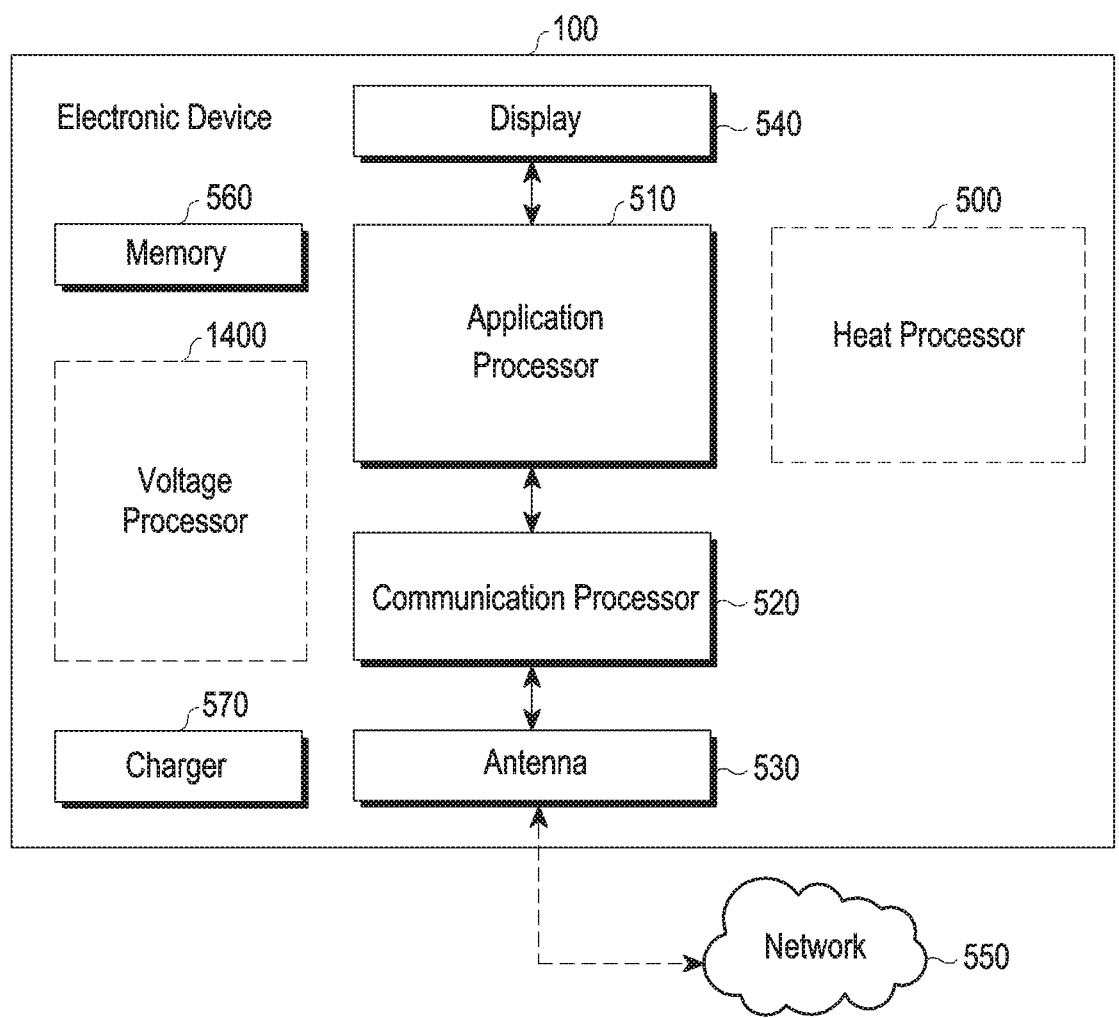
FIG. 14A is a block diagram illustrating an electronic device according to an embodiment of the disclosure.

FIG. 14A is a block diagram illustrating an electronic device according to an embodiment of the disclosure.

Figure 14B:
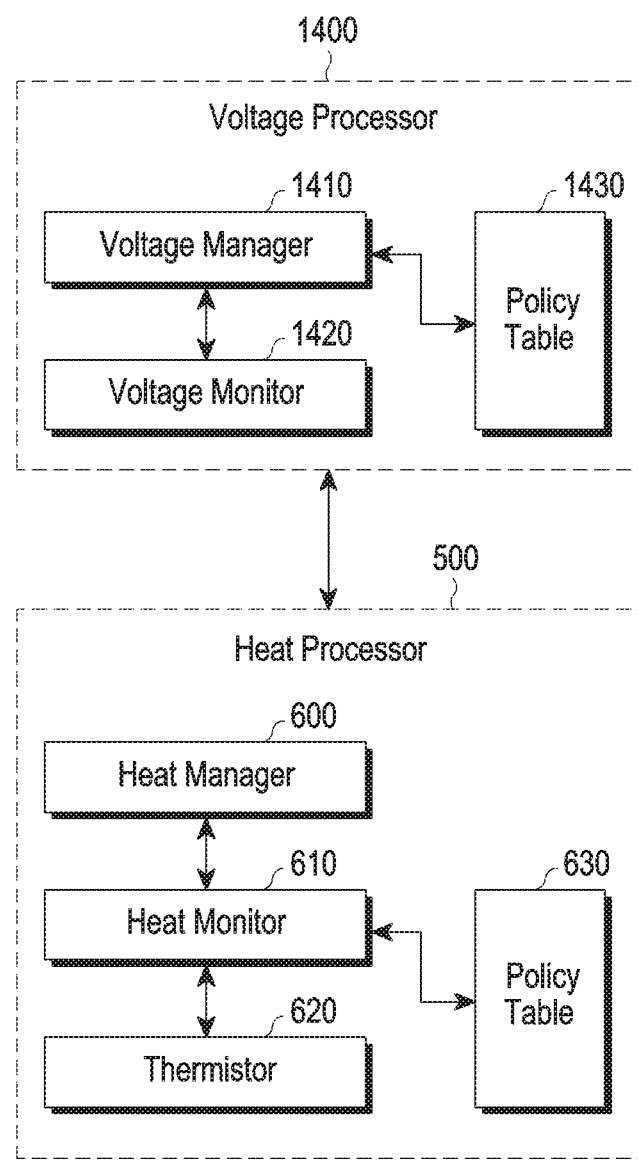
FIG. 14B is a block diagram illustrating an electronic device according to an embodiment of the disclosure.

FIG. 14B is a block diagram illustrating an electronic device according to an embodiment of the disclosure.

Referring to FIG. 14A, the electronic device 100 may include a heat processor 500, an AP 510, a CP 520, an antenna 530, a display 540, a memory 560, a charger 570, and a voltage processor 1400. For example, the electronic device 100 may communicate with a network 550 via the antenna 530.

Referring to FIG. 14B, the electronic device 100 may include the voltage processor 1400 and the heat processor 500. The voltage processor 1400 may include a voltage manager 1410, a voltage monitor 1420, and a policy table 1430. The heat processor 500 may include a heat manager 600, a heat monitor 610, one or more thermistors 620, and a policy table 630.

The voltage monitor 1420 may measure the voltage of the battery which supplies power to the electronic device 100. The voltage manager 1410 may identify the remaining power that the battery may supply based on the value that the voltage monitor 1420 measures from the battery supplying power to the electronic device 100. According to an embodiment, the voltage monitor 1420 may measure the battery voltage by identifying the fuel gauge value. The voltage monitor 1420 may output the measured battery voltage to the voltage manager 1410. The policy table 1430 may include information for a reference voltage. For example, the reference voltage may be a threshold voltage at which an excessive voltage drop may occur in the electronic device 100. The reference voltage may be varied depending on whether specific software of the electronic device 100 is executed. If the electronic device 100 executes first software (an application), the threshold voltage at which an excessive voltage drop may occur may correspond to a first reference voltage. If the electronic device 100 does not execute first software (an application), the threshold voltage at which an excessive voltage drop may occur may correspond to a second reference voltage. According to an embodiment, if the electronic device 100 executes second software (an application), the threshold voltage at which an excessive voltage drop may occur may correspond to a third reference voltage. According to an embodiment, the voltage monitor 1420 may determine whether the electronic device 100 executes software (an application). The heat monitor 610 may determine whether the electronic device 100 executes software (an application). For example, the voltage monitor 1420 or heat monitor 610 may determine whether the electronic device 100 executes software (an application) by identifying at least one of the radio access technology (RAT) requirement, quality-of-service (QoS), or pattern of consumed current quantity.

According to an embodiment, the voltage monitor 1420 or the heat monitor 610 may differentiate between when the application installed on the electronic device 100 runs and when the application does not.

According to an embodiment, when the application installed on the electronic device 100 runs, the voltage monitor 1420 or heat monitor 610 may identify whether a 5G communication environment needs to be provided. For example, the voltage monitor 1420 or heat monitor 610 may identify the RAT requirement stored in the application, thereby identifying whether the 5G communication environment needs to be provided to the application. For example, the voltage monitor 1420 or heat monitor 610 may identify the QoS stored in the application, thereby identifying whether the 5G communication environment needs to be provided to the application. For example, the voltage monitor 1420 or heat monitor 610 may identify the pattern of current consumed when the application runs, thereby identifying whether the 5G communication environment needs to be provided to the application. For example, the voltage monitor 1420 or heat monitor 610 may identify whether a 5G hardware logic is used when the application runs, thereby identifying whether the 5G communication environment needs to be provided to the application.

The voltage monitor 1420 may compare the measured battery voltage with the reference voltage. When the measured battery voltage is the reference voltage or less, the voltage monitor 1420 may determine that an excessive voltage drop is likely to occur in the electronic device 100. According to an embodiment, the voltage monitor 1420 may compare a first reference voltage with the measured battery voltage when the electronic device 100 runs the software (an application). The voltage monitor 1420 may compare a second reference voltage with the measured battery voltage when the electronic device 100 does not run the software (an application).

The heat monitor 610 may compare the measured battery voltage with the reference voltage. When the measured battery voltage is the reference voltage or less, the heat monitor 610 may determine that an excessive voltage drop is likely to occur in the electronic device 100. According to an embodiment, the heat monitor 610 may compare a first reference voltage with the measured battery voltage when the electronic device 100 runs the software (an application). The heat monitor 610 may compare a second reference voltage with the measured battery voltage when the electronic device 100 does not run the software (e.g., an application).

Upon determining that an excessive voltage drop is likely to occur in the electronic device 100, the electronic device 100 may transmit, to the base station 10, a first message (UE assistance information) containing the above-described pieces of information transmittable for overheating in response to the determination that an excessive voltage drop is likely to occur. According to an embodiment, upon determining that an excessive voltage drop is likely to occur in the electronic device 100, the voltage manager 1410 may indicate information about the determination that an excessive voltage drop is likely to occur to at least one of the first CP or the second CP. According to an embodiment, at least one of the first CP or the second CP may transmit, to the base station 10, the first message (UE assistance information) containing the above-described pieces of information transmittable for overheating based on the indication from the voltage manager 1410.

According to an embodiment, the electronic device 100 may include a performance information value for the electronic device 100 which the electronic device 100 may reduce in the first message (UE assistance information).

According to an embodiment, the first message (UE assistance information) may include the information for the reduced maximum bandwidth (reducedMaxBW-FR1) of the first frequency range (FR1) or the information for the reduced maximum bandwidth (reducedMaxBW-FR2) of the second frequency range (FR2).

According to an embodiment, the first message (UE assistance information) may include information about the reduced maximum MIMO rank count (reducedMaxMIMO-LayersFR1) of the first frequency range (FR1) or information about the reduced maximum MIMO rank count (reducedMaxMIMO-LayersFR2) of the second frequency range (FR2).

All of the above-described embodiments of transferring overheat in the electronic device 100 to the base station 10 may apply likewise to the way to transfer an excessive voltage drop in the electronic device 100 to the base station 10.

Figure 15A:
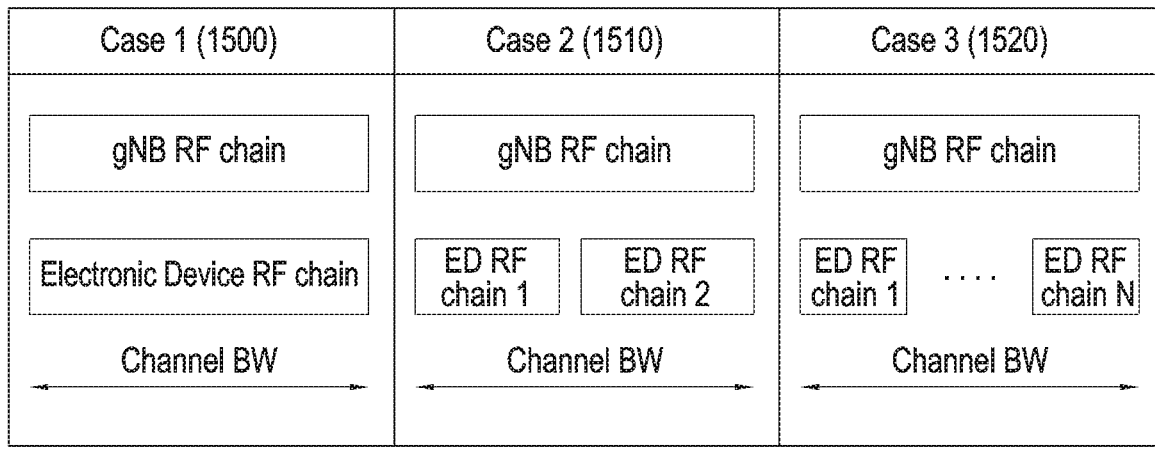
FIG. 15A is a table illustrating an example of setting a reduced maximum bandwidth by an electronic device according to an embodiment of the disclosure.

FIG. 15A is a table illustrating an example of setting a reduced maximum bandwidth by an electronic device according to an embodiment of the disclosure.

According to an embodiment, the electronic device 100 may include a plurality of radio frequency chains.

Referring to FIG. 15A, Case 1 1500 represents an embodiment in which the electronic device 100 covers the same channel bandwidth as the channel bandwidth of the base station with one radio frequency chain. Case 2 1510 and Case 3 1520 each represents an embodiment in which the electronic device 100 covers the same channel bandwidth as the channel bandwidth of the base station with multiple radio frequency chains. When the electronic device 100 covers the channel bandwidth with a plurality of radio frequency chains, the channel bandwidth each radio frequency chain covers may be identical or may differ. For example, Case 2 1510 may represent an example in which the plurality of radio frequency chains have different bandwidths. For example, Case 3 1520 may represent an example in which the plurality of radio frequency chains have the same bandwidth.

The electronic device 100 may transmit overheat assistance information (OverheatingAssistance) generated in response to identifying overheat inside to the base station 10. The overheat assistance information (OverheatingAssistance) may include information for sending a request for reallocating the allocated channel bandwidth to the base station 10.

According to an embodiment, the electronic device 100 may store information for the radio frequency chain bandwidths 1500, 1510, and 1520, the electronic device 100 supports, in the memory 560 of the electronic device 100. For example, the electronic device 100 may transfer the information for the radio frequency chain bandwidths 1500, 1510, and 1520 stored in the memory 560 to the base station 10. According to an embodiment, the base station 10 may identify the information for the radio frequency chain bandwidths 1500, 1510, and 1520, which the electronic device 100 supports, based on the information received from the electronic device 100.

According to an embodiment, the electronic device 100 may configure channelBWs-DL and a channelBWs-UL information using the information for the radio frequency chain (RF chain) configured in the electronic device 100. According to an embodiment, the band and bandwidth information that the radio frequency chain configured in the electronic device 100 supports may be stored in a non-transitory memory configured in the electronic device 100. According to an embodiment, the channelBWs-DL and channelBWs-UL information may be included in the RF-Parameters of the UECapabilityInformation which is a message for transferring performance information for the electronic device 100. According to an embodiment, the electronic device 100 may transmit the UECapabilityInformation to the base station 10.

According to an embodiment, the base station 10 may be aware of the downlink channel bandwidth and uplink channel bandwidth information, which the electronic device 100 may support, using the information contained in the UECapabilityInformation.

According to an embodiment, the electronic device 100 may request the base station 10 to reallocate the smallest channel bandwidth as it supports. According to an embodiment, the electronic device 100 may request the base station 10 to reallocate the smallest channel bandwidth among channel bandwidths it supports.

According to an embodiment, when the electronic device 100 includes a plurality of radio frequency chains, the electronic device 100 may request the base station 10 to reallocate the smallest channel bandwidth among the channel bandwidths the plurality of radio frequency chains support. According to an embodiment, when the electronic device 100 includes a plurality of radio frequency chains, the electronic device 100 may request the base station 10 to reallocate a smaller channel bandwidth than the allocated channel bandwidth among the channel bandwidths the plurality of radio frequency chains support.

Figure 15B:
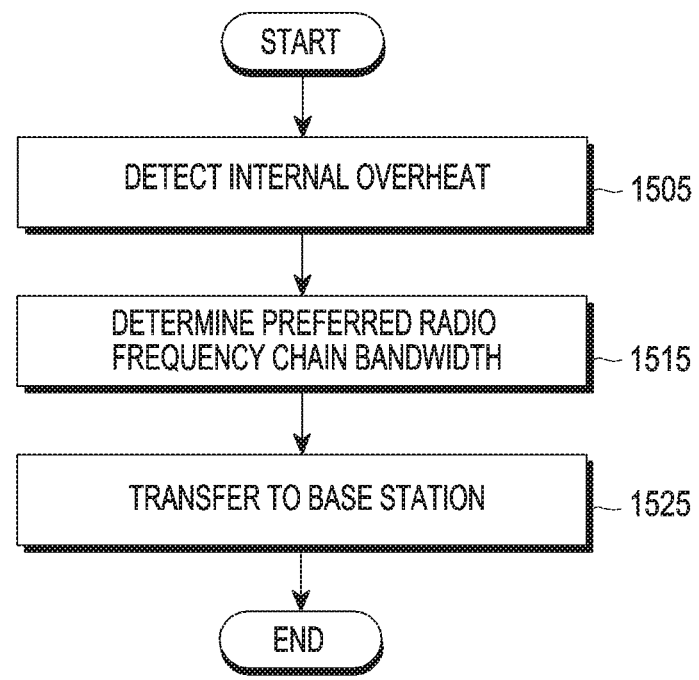
FIG. 15B is a flowchart illustrating an example of controlling internal heat by an electronic device according to an embodiment of the disclosure.

FIG. 15B is a flowchart illustrating an example of controlling internal heat by an electronic device according to an embodiment of the disclosure.

Referring to FIG. 15B, according to an embodiment, in operation 1505, the electronic device 100 may detect internal heat.

According to an embodiment, in operation 1515, the electronic device 100 may determine a preferred radio frequency chain bandwidth.

According to an embodiment, in operation 1525, the electronic device 100 may transfer the determined radio frequency chain bandwidth to the base station 10.

Figure 16A:
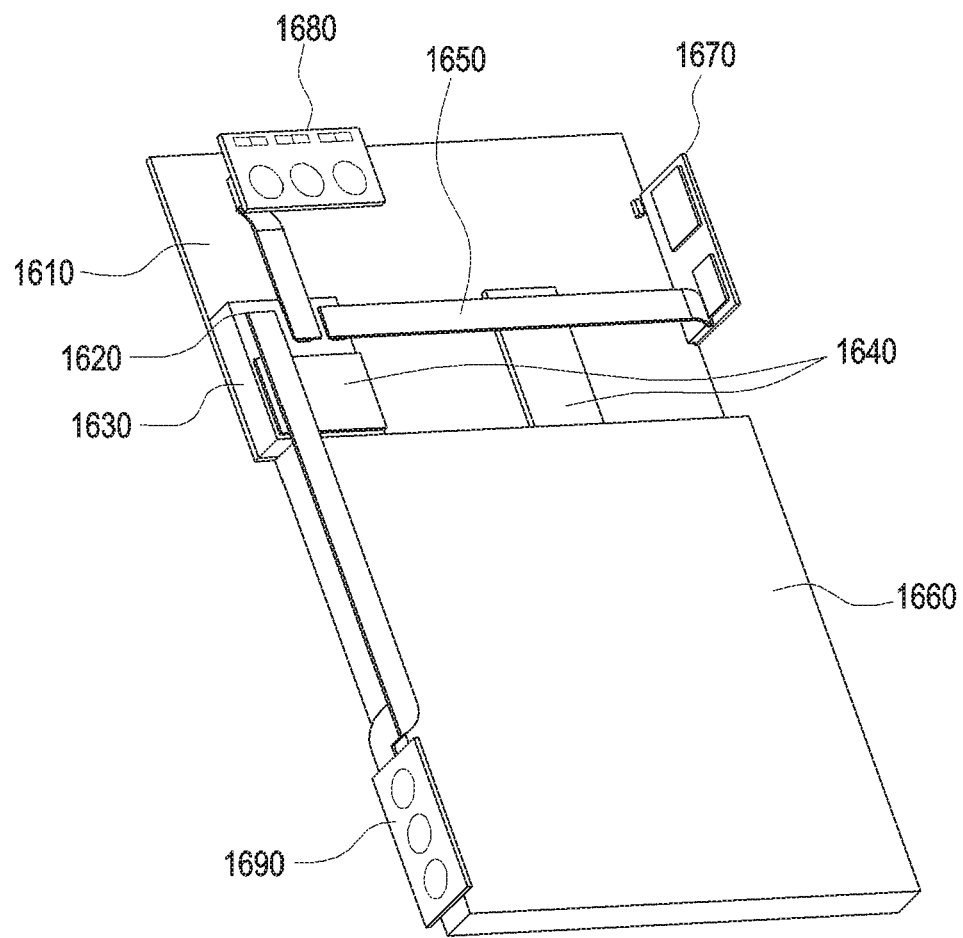
FIG. 16A is view illustrating a hardware configuration of an electronic device according to an embodiment of the disclosure.

FIG. 16A is a view illustrating a hardware configuration of an electronic device according to an embodiment of the disclosure.

Figure 16B:
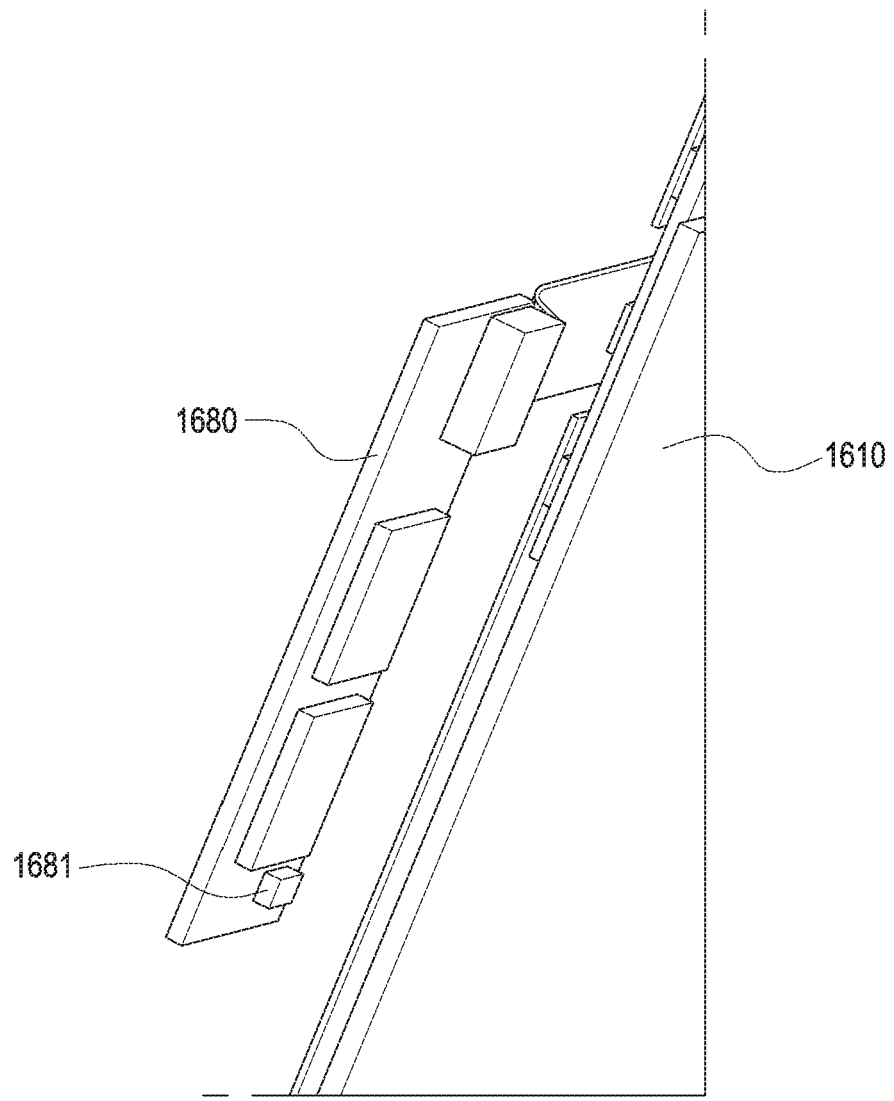
FIG. 16B is view illustrating a hardware configuration of an electronic device according to an embodiment of the disclosure.

FIG. 16B is a view illustrating a hardware configuration of an electronic device according to an embodiment of the disclosure.

Figure 16C:
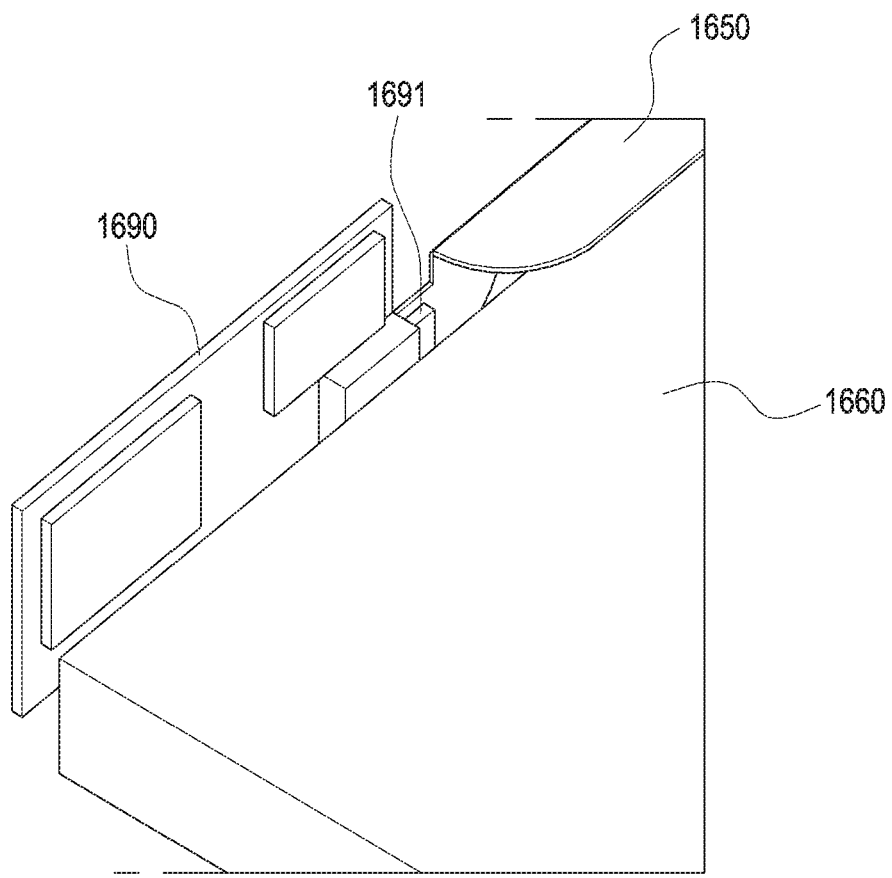
FIG. 16C is view illustrating a hardware configuration of an electronic device according to an embodiment of the disclosure.

FIG. 16C is a view illustrating a hardware configuration of an electronic device according to an embodiment of the disclosure.

FIG. 16A is a side perspective view illustrating a modular configuration packaged in the housing of the electronic device 100.

Referring to FIG. 16A, the electronic device 100 may include, in the housing, a main printed circuit board (PCB) 1610, a sub PCB 1620, a battery 1660, a first antenna module 1670, a second antenna module 1680, or a third antenna module 1690.

According to an embodiment, the main PCB 1610 may include a plurality of conductive layers and a plurality of non-conductive layers alternately stacked with the conductive layers. For example, electronic components arranged on, or outside of, the main PCB 1610 may be electrically connected together via wires and conductive vias formed on or through the conductive layers.

According to an embodiment, the main PCB 1610 may be electrically connected with other modules via a plurality of connectors or an interposer 1630 or flexible printed circuit board (FPCB) 1650. For example, the main PCB 1610 may be electrically connected with the sub PCB 1620 via the interposer 1630, and the sub PCB 1620 may be electrically connected with the first antenna module 1670, the second antenna module 1680, and the third antenna module 1690 via the FPCB 1650.

According to an embodiment, the sub PCB 1620 may include a CP and an intermediate frequency integrated circuit (IFIC), and these components may be packaged inside a shield can 1640. The CP is a communication processor in charge of communication, such as data transmission/reception and may support LTE communication and/or 5G communication for the electronic device 100. For example, the CP may be included in the processor 120 of the electronic device 100.

According to an embodiment, the CP may be configured to include a first CP supporting legacy network communication and a second CP supporting 5G network communication. An AP may be mounted on a PCB under the sub PCB 1620. The AP is a processor in charge of controlling the electronic device 100 and may control at least one other component (e.g., a hardware or software component) and process or compute various types of data. According to an embodiment, a temperature sensor may be added around the CP or AP to identify whether the CP or AP is overheated.

The FPCB 1650 may include an mmWave transceiver control signal line, a power management integrated circuit (PMIC) control signal line, a PMIC power supply line, or a signal line for the IFIC.

According to an embodiment, the first antenna module 1670 may include a module PCB, an mmWave transceiver, a PMIC, or an antenna array. For example, an mmWave transceiver or PMIC may be disposed on a first surface of the module PCB of the first antenna module 1670, and an antenna array may be disposed on a second surface which is different from the first surface. For example, the antenna array may include a patch antenna array and emit signals in a first side direction (e.g., a right side direction of the electronic device 100) of the electronic device 100.

According to an embodiment, a temperature sensor may be added to identify whether the first antenna module 1670 is overheated. The temperature sensor may be disposed on the main PCB 1610 adjacent to the first antenna module 1670 and may measure the temperature of the first antenna module 1670 at each designated period or continuously, thereby identifying the degree of heating. The temperature sensor may be connected with the CP or AP. The temperature information for the first antenna module 1670 measured by the temperature sensor may be transferred to the CP or AP, and the electronic device 100 may determine whether the first antenna module 1670 is overheated using the received temperature information.

According to an embodiment, the second antenna module 1680 may include a module PCB, an mmWave transceiver, a PMIC, or an antenna array. For example, an mmWave transceiver or PMIC may be disposed on a first surface of the module PCB of the second antenna module 1680, and an antenna array may be disposed on a second surface which is different from the first surface. The antenna array may include both a dipole antenna array and a patch antenna array, but embodiments of the disclosure are not limited thereto. The dipole antenna array may radiate signals in a second side direction (e.g., the top direction of the electronic device 100) of the electronic device 100, and the patch antenna array may radiate signals in a third side direction (e.g., a rear direction perpendicular to the patch) of the electronic device 100.

FIG. 16B illustrates a configuration of the second antenna module 1680 included in the electronic device 100.

Referring to FIG. 16B, a second temperature sensor 1681 may be placed to identify whether the second antenna module 1680 is overheated. According to an embodiment, the second antenna module 1680 may be disposed a predetermined interval apart from the main PCB 1610. For example, the second temperature sensor 1681 may be disposed on the module PCB of the second antenna module 1680 and may measure the temperature of the second antenna module 1680 at each designated period or continuously, thereby identifying the degree of heating.

According to an embodiment, the second antenna module 1680 including both the dipole antenna array and the patch antenna array may include the module PCB which is relatively large in area as compared with the other antenna modules. Thus, the module PCB of the second antenna module 1680 may have a space for packing the second temperature sensor 1681. According to an embodiment, the temperature information for the second antenna module 1680 measured by the second temperature sensor 1681 may be transferred to the CP or AP, and the CP or AP may determine whether the second antenna module 1680 is overheated based on the temperature information for the second antenna module 1680 obtained from the second temperature sensor 1681.

FIG. 16C illustrates a configuration of the third antenna module 1690 included in the electronic device 100.

The third antenna module 1690 may include a module PCB, an mmWave transceiver, a PMIC, or an antenna array. For example, an mmWave transceiver or PMIC may be disposed on a first surface of the module PCB of the third antenna module 1690, and an antenna array may be disposed on a second surface which is different from the first surface. For example, the antenna array may include a patch antenna array and emit signals in a fourth side direction (e.g., a left side direction of the electronic device 100) of the electronic device 100.

Referring to FIG. 16C, a third temperature sensor 1691 may be placed to identify whether the third antenna module 1690 is overheated. According to an embodiment, since the third antenna module 1690 is disposed adjacent to the battery 1660 placed on the bottom of the main PCB 1610, the third antenna module 1690 may be sufficiently spaced apart from the main PCB 1610. According to an embodiment, the third antenna module 1690 includes the patch antenna array alone and the module PCB therefor may be small in area.

According to an embodiment, given the limited module PCB area of the third antenna module 1690 and measurement accuracy of the third temperature sensor 1691, the third temperature sensor 1691 may be disposed on the FPCB 1650 in a position adjacent to the third antenna module 1690 and may measure the temperature of the third antenna module 1690 as per predetermined periods or continuously, thereby identifying the degree of heating.

According to an embodiment, the third temperature sensor 1691 may be connected with the CP or AP to transfer the temperature information measured for the third antenna module 1690 to the CP or AP. A reference for determining the degree of heating for the antenna modules may be set to differ per antenna module. Although the temperature information measured by the temperature sensor disposed corresponding to each antenna module inside the electronic device 100 may be proportional to the surface heating state of each antenna module, a different reference for determining heating information may be set per module because the amount of heat transferred to the outside of the antenna module may be varied depending on the packing structure or heat-radiating structure of each antenna module. For example, if the overheat temperature of the first antenna module 1670 measured by the first temperature sensor 1671 is not less than 70° C. which is set as the overheat reference temperature for the first antenna module, the first antenna module 1670 may be determined to be in the overheated state. When the first antenna module 1670 is identified to be overheated, the electronic device 100 may perform communication using the second antenna module 1680 or the third antenna module 1690 instead of the first antenna module 1670.

According to an embodiment, while communication is performed using the second antenna module 1680 or the third antenna module 1690, the communication operation of the first antenna module 1670 may be stopped to reduce heat in the first antenna module 1670. For example, if the temperature of the first antenna module 1670 is not less than 60° C. which is set as a candidate beam measurement reference temperature for the first antenna module 1670, it may be excluded from the candidate beam list or neighbor beam list for a designated time. For example, after the designated time elapses and if the first antenna module 1670 is cooled down to 60° C. or less, it may be added back in the candidate beam list or neighbor beam list.

According to an embodiment, the overheat reference temperature and candidate beam measurement reference temperature for the second antenna module 1680 or the third antenna module 1690 may be set to differ from those of the first antenna module 1670 and may be used as heating state determination references when the second antenna module 1680 or the third antenna module 1690 operates.

The overheat reference temperature and candidate beam measurement reference temperature for each antenna module may be set as a hysteresis condition for each antenna module, preventing a state variation in determination of heating. The per-module heating information determination references are provided merely as an example and are not limited by any one embodiment but may rather be set to various values considering the placement of the temperature sensor corresponding to each antenna module.

Figures 17A, 17B:
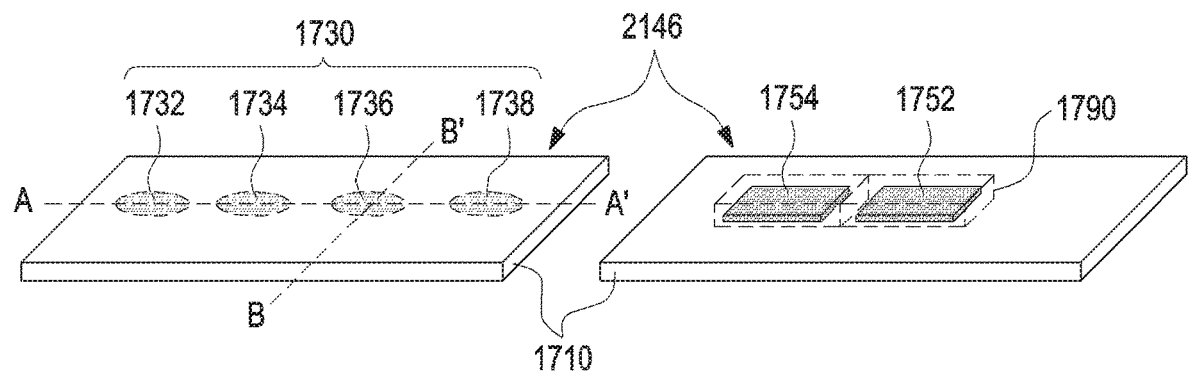
FIG. 17A is a view illustrating a structure of an antenna module according to an embodiment of the disclosure.
FIG. 17B is a view illustrating a structure of an antenna module according to an embodiment of the disclosure.
Figure 17C:
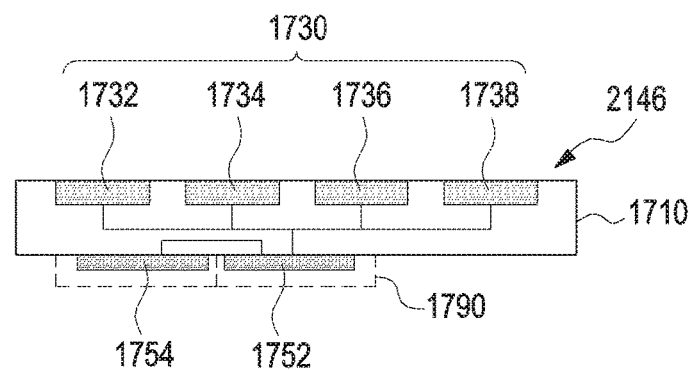
FIG. 17C is a view illustrating a structure of an antenna module according to an embodiment of the disclosure.

FIG. 17A illustrates an example structure of the third antenna module 2146 described above in connection with FIG. 1B. FIG. 17B illustrates an example structure of the third antenna module 2146 described above in connection with FIG. 1B. FIG. 17C illustrates an example structure of the third antenna module 2146 described above in connection with FIG. 1B.

FIG. 17A is a view illustrating a structure of an antenna module according to an embodiment of the disclosure.

FIG. 17B is a view illustrating a structure of an antenna module according to an embodiment of the disclosure.

FIG. 17C is a view illustrating a structure of an antenna module according to an embodiment of the disclosure.

Referring to FIGS. 17A, 17B, and 17C, according to an embodiment, the third antenna module 2146 may include a PCB 1710, an antenna array 1730, a radio frequency integrated circuit (RFIC) 1752, a power management integrated circuit (PMIC) 1754, and a module interface. Selectively, the third antenna module 2146 may further include a shielding member 1790. According to an embodiment, at least one of the above-mentioned components may be omitted, or at least two of the components may be integrally formed with each other.

The PCB 1710 may include a plurality of conductive layers and a plurality of non-conductive layers alternately stacked with the conductive layers. Electronic components arranged on, or outside of, the PCB 1710 may be electrically connected together via wires and conductive vias formed on or through the conductive layers.

The antenna array 1730 (e.g., 2148 of FIG. 1B) may include a plurality of antenna elements 1732, 1734, 1736, or 1738 arranged to form directional beams. The antenna elements may be formed on a first surface of the PCB 1710 as shown. Alternatively, the antenna array 1730 may be formed inside the PCB 1710. According to an embodiment, the antenna array 1730 may include a plurality of antenna arrays (e.g., a dipole antenna array and/or a patch antenna array) of the same or different shapes or kinds.

The RFIC 1752 (e.g., 2126 of FIG. 1B) may be disposed in another area (e.g., a second surface opposite to the first surface) of the PCB 1710 which is spaced apart from the antenna array. The RFIC is configured to be able to process signals of a selected frequency band which are transmitted or received via the antenna array 1730. According to an embodiment, upon transmission, the RFIC 1752 may convert a baseband signal obtained from a CP (not shown) into a designated band of RF signal. Upon receipt, the RFIC 1752 may transfer the RF signal received via the antenna array 1752 into a baseband signal and transfer the baseband signal to the CP.

According to an embodiment, upon transmission, the RFIC 1752 may up-convert an IF signal (e.g., ranging from about 9 GHz to about 11 GHz) obtained from the IFIC (e.g., 2128 of FIG. 1B) into a selected band of RF signal. Upon receipt, the RFIC 1752 may down-convert the RF signal obtained via the antenna array 1752 into an IF signal and transfer the IF signal to the IFIC.

The PMIC 1754 may be disposed in another portion (e.g., the second surface) of the PCB 1710 which is spaced apart from the antenna array. The PMIC may receive a voltage from the main PCB (not shown) and provide necessary power to various components (e.g., the RFIC 1752) on the antenna module.

The shielding member 1790 may be disposed in a portion (e.g., the second surface) of the PCB 1710 to electromagnetically shield off at least one of the RFIC 1752 or the PMIC 1754. According to an embodiment, the shielding member 1790 may include a shield can.

Although not shown, the third antenna module 2146 may be electrically connected with another PCB (e.g., the main PCB) via the module interface. The module interface may include a connecting member, e.g., a coaxial cable connector, board-to-board connector, interposer, or FPCB. The RFIC 1752 and/or the PMIC 1754 may be electrically connected with the PCB via the connecting member.

Various embodiments as set forth herein may be implemented as software (e.g., the program) including one or more instructions that are stored in a storage medium (e.g., internal memory or external memory) that is readable by a machine (e.g., the electronic device 100). For example, a processor of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

As is apparent from the foregoing description, according to various embodiments, there may be provided an apparatus and method for controlling overheat in an electronic device. There may also be provided an apparatus and method for efficiently controlling overheat in an electronic device by controlling overheating in the electronic device via communication with a base station.

While the disclosure has been shown and described with reference to various embodiments thereof, it will be understood by those skilled in the art that various changes in form and details may be made therein without departing from the spirit and scope of the disclosure which is defined by the appended claims and their equivalents.

What is claimed is:

1. An electronic device configured to communicate with a base station based on a first frequency range and a second frequency range, the electronic device comprising:
   a transceiver; and
   at least one processor connected with the transceiver,
   wherein the at least one processor is configured to:
      identify overheat inside the electronic device, and
      transmit, via the transceiver to the base station, a first message containing overheat assistance information generated in response to identifying the overheat inside the electronic device,
   wherein the overheat assistance information includes information about a reduced maximum bandwidth of the first frequency range or information about a reduced maximum bandwidth of the second frequency range higher than the first frequency range, and
   wherein the information about the reduced maximum bandwidth of the first frequency range includes at least one value associated with reduced aggregated bandwidth for the first frequency range and information about the reduced maximum bandwidth of the second frequency range includes at least one value associated with reduced aggregated bandwidth for the second frequency range.

2. The electronic device of claim 1,
   wherein the information about the reduced maximum bandwidth of the first frequency range includes information indicating a reduced maximum bandwidth of a downlink of the first frequency range and information indicating a reduced maximum bandwidth of an uplink of the first frequency range, and
   wherein the information about the reduced maximum bandwidth of the second frequency range includes information indicating a reduced maximum bandwidth of a downlink of the second frequency range and information indicating a reduced maximum bandwidth of an uplink of the second frequency range.

3. The electronic device of claim 2, wherein each of the information indicating the reduced maximum bandwidth of the downlink of the second frequency range and the information indicating the reduced maximum bandwidth of the uplink of the second frequency range is set to one of a plurality of values including 0 MHz.

4. The electronic device of claim 1, wherein the at least one processor is further configured to:
transmit, to the base station, a second message containing information about whether the electronic device supports the overheat assistance information.

5. The electronic device of claim 1, further comprising:
a thermistor connected with the at least one processor or a thermistor connected with at least one antenna module,
wherein the at least one processor is further configured to measure a temperature of the at least one processor or the at least one antenna module using the thermistor connected with the at least one processor and the thermistor connected with the at least one antenna module and compare the measured temperature with a threshold temperature.

6. The electronic device of claim 5, wherein the temperature of the at least one processor or the at least one antenna module is measured using the at least one thermistor and at least one temperature sensor connected in parallel with each of the at least one thermistor.

7. The electronic device of claim 5, wherein the threshold temperature is a temperature value resulting from applying an offset determined depending on a communication state with the base station to a preset temperature value.

8. The electronic device of claim 1,
wherein the at least one processor is further configured to receive a third message from the base station in response to the first message, and
wherein the third message includes the information about the reduced maximum bandwidth of the first frequency range or the information about the reduced maximum bandwidth of the second frequency range for the electronic device.

9. The electronic device of claim 1, wherein the at least one processor is further configured to:
drive a timer in response to the transmission of the first message, and
upon failing to receive a third message including the information about the reduced maximum bandwidth of the first frequency range or the information about the reduced maximum bandwidth of the second frequency range for the electronic device in response to the first message before until the timer expires, retransmit the first message to the base station.

10. The electronic device of claim 1, wherein the at least one processor is further configured to:
drive a timer in response to the transmission of the first message,
upon failing to receive a third message including the information about the reduced maximum bandwidth of the first frequency range or the information about the reduced maximum bandwidth of the second frequency range for the electronic device in response to the first message before until the timer expires, identify the overheat inside the electronic device, and
in response to identifying the overheat inside the electronic device, retransmit the first message to the base station.

11. The electronic device of claim 1, wherein, when the electronic device includes a plurality of radio frequency chains, the reduced maximum bandwidth of the first frequency range or the reduced maximum bandwidth of the second frequency range is set to a smallest frequency bandwidth settable among a plurality of frequency bandwidths supported by each of the plurality of radio frequency chains.

12. The electronic device of claim 1,
wherein the processor includes an application processor (AP) and a communication processor (CP), and
wherein the AP is configured to identify the overheat inside the electronic device and transmit, to the CP, overheat assistance information generated in response to identifying the overheat inside the electronic device, and the CP is configured to transmit the overheat assistance information-containing first message to the base station in response to receiving the overheat assistance information.

13. An electronic device configured to communicate with a base station based on a first frequency range and a second frequency range, the electronic device comprising:
a transceiver; and
at least one processor connected with the transceiver,
wherein the at least one processor is configured to:
identify overheat inside the electronic device, and
transmit, via the transceiver to the base station, a first message containing overheat assistance information generated in response to identifying the overheat inside the electronic device,
wherein the overheat assistance information includes information about a reduced maximum multi-input multi-output (MIMO) rank count of the first frequency range or information about a reduced maximum MIMO rank count of the second frequency range higher than the first frequency range,
wherein the processor includes an application processor (AP) and a communication processor (CP), and
wherein the AP is configured to identify the overheat inside the electronic device and transmit, to the CP, overheat assistance information generated in response to identifying the overheat inside the electronic device, and the CP is configured to transmit the overheat assistance information-containing first message to the base station in response to receiving the overheat assistance information.

14. The electronic device of claim 13,
wherein the information about the reduced maximum MIMO rank count of the first frequency range includes information indicating a reduced maximum MIMO rank count of a downlink of the first frequency range and information indicating a reduced maximum MIMO rank count of an uplink of the first frequency range, and
wherein the information about the reduced maximum MIMO rank count of the second frequency range includes information indicating a reduced maximum MIMO rank count of a downlink of the second frequency range and information indicating a reduced maximum MIMO rank count of an uplink of the second frequency range.

15. The electronic device of claim 13, wherein the at least one processor is further configured to:
transmit, to the base station, a second message containing information about whether the electronic device supports the overheat assistance information.

16. An electronic device configured to communicate with a base station based on a first frequency range and a second frequency range, the electronic device, comprising:
a transceiver; and
at least one processor connected with the transceiver,
wherein the at least one processor is configured to compare a reference voltage with a voltage of a battery configured to supply power to the electronic device and, when the battery voltage is a reference voltage or less, transmit a first message containing overheat assistance information to a base station, wherein the overheat assistance information includes information about a reduced maximum bandwidth of the first frequency range or information about a reduced maximum bandwidth of the second frequency range higher than the first frequency range, and wherein the information about the reduced maximum bandwidth of the first frequency range includes at least one value associated with reduced aggregated bandwidth for the first frequency range and information about the reduced maximum bandwidth of the second frequency range includes at least one value associated with reduced aggregated bandwidth for the second frequency range.

17. The electronic device of claim 16,
wherein the information about the reduced maximum bandwidth of the first frequency range includes information indicating a reduced maximum bandwidth of a downlink of the first frequency range and information indicating a reduced maximum bandwidth of an uplink of the first frequency range, and wherein the information about the reduced maximum bandwidth of the second frequency range includes information indicating a reduced maximum bandwidth of a downlink of the second frequency range and information indicating a reduced maximum bandwidth of an uplink of the second frequency range.

18. The electronic device of claim 16,
wherein the processor includes an application processor (AP) and a communication processor (CP), and wherein the AP is configured to compare the reference voltage with the battery voltage and, when the battery voltage is the reference voltage or less, transmit the overheat assistance information to the CP, and the CP is configured to transmit the overheat assistance information-containing first message to the base station in response to receiving the overheat assistance information.

* * * * *